(12) United States Patent
Yang

(10) Patent No.: US 11,827,050 B2
(45) Date of Patent: Nov. 28, 2023

(54) LUMINOUS STONE PRODUCT AND MANUFACTURING METHOD THEREFOR

(71) Applicant: Jianqiao Yang, North York (CA)

(72) Inventor: Jianqiao Yang, North York (CA)

( * ) Notice: Subject to any disclaimer, the term of this patent is extended or adjusted under 35 U.S.C. 154(b) by 232 days.

(21) Appl. No.: 17/297,990

(22) PCT Filed: Nov. 29, 2019

(86) PCT No.: PCT/CN2019/121969
§ 371 (c)(1),
(2) Date: May 27, 2021

(87) PCT Pub. No.: WO2020/108616
PCT Pub. Date: Jun. 4, 2020

(65) Prior Publication Data
US 2022/0097446 A1    Mar. 31, 2022

(30) Foreign Application Priority Data

Nov. 30, 2018 (CN) .......................... 201822016286.9
Apr. 15, 2019 (CN) .......................... 201910298769.9
(Continued)

(51) Int. Cl.
*F21V 8/00* (2006.01)
*B44C 5/06* (2006.01)
*F21V 9/30* (2018.01)
*B28D 1/04* (2006.01)
*B44F 1/06* (2006.01)
(Continued)

(52) U.S. Cl.
CPC ................ *B44C 5/06* (2013.01); *A47B 13/12* (2013.01); *B28D 1/048* (2013.01); *B44F 1/06* (2013.01);
(Continued)

(58) Field of Classification Search
CPC ....... E01C 17/00; A47B 13/12; G02B 6/0011; G02B 6/0033–0043; G02B 6/0065;
(Continued)

(56) References Cited

U.S. PATENT DOCUMENTS

| 2012/0301713 | A1 | 11/2012 | Hong | |
|---|---|---|---|---|
| 2014/0340897 | A1* | 11/2014 | Thijssen | F21V 11/00 29/428 |
| 2016/0320048 | A1 | 11/2016 | Daniels | |

FOREIGN PATENT DOCUMENTS

| CN | 1249243 A | 4/2000 |
|---|---|---|
| CN | 2578115 Y | 10/2003 |

(Continued)

*Primary Examiner* — Sean P Gramling

(57) ABSTRACT

The present invention relates to the field of building decoration. Disclosed is a luminous stone product including a natural stone panel, a light source, and a light-guide board. The natural stone panel includes at least one cavity and at least one light transmitting side; any of the cavities is correspondingly provided at the back side of the at least one light transmitting side, and any of the cavities extends to an edge of the natural stone panel and forms at least one opening; the light source is provided at the opening of the natural stone panel; the light-guide board is placed in the cavity and acquires light from the light source, and a gap between the light-guide board and the inner wall of the cavity is filled with a curable transparent adhesive resin. According to the present invention, the light-guide board is utilized to guide light, such that a point light source is changed into a planar light source which can emit light uniformly.

20 Claims, 15 Drawing Sheets

US 11,827,050 B2

Page 2

(30) Foreign Application Priority Data

Oct. 12, 2019 (CN) .......... 201921709850.3
Oct. 12, 2019 (CN) .......... 201921713262.7

(51) Int. Cl.
*F21V 9/08* (2018.01)
*F21V 33/00* (2006.01)
*A47B 13/12* (2006.01)

(52) U.S. Cl.
CPC ............. *F21V 9/08* (2013.01); *F21V 9/30* (2018.02); *F21V 33/0004* (2013.01); *G02B 6/0021* (2013.01)

(58) Field of Classification Search
CPC .. G02B 6/0073; G02B 6/0095; G02B 6/0096; F21S 8/022
See application file for complete search history.

(56) References Cited

FOREIGN PATENT DOCUMENTS

| | | |
|---|---|---|
| CN | 1583429 A | 2/2005 |
| CN | 201850726 U | 6/2011 |
| CN | 102254907 A | 11/2011 |
| CN | 202055438 U | 11/2011 |
| CN | 103806633 A | 5/2014 |
| CN | 103938816 A | 7/2014 |
| CN | 104118160 A | 10/2014 |
| CN | 206034831 U | 3/2017 |
| CN | 106894602 A | 6/2017 |
| CN | 206319522 U | 7/2017 |
| CN | 107150548 A | 9/2017 |
| CN | 108045151 A | 5/2018 |
| CN | 207594626 U | 7/2018 |
| CN | 208122149 U | 11/2018 |
| CN | 208184133 U | 12/2018 |
| CN | 109968543 A | 7/2019 |
| CN | 209277447 U | 8/2019 |
| DE | 102014117273 A1 | 5/2016 |
| EP | 0502880 B1 | 8/1993 |
| EP | 538376 B1 | 6/1996 |
| ES | 2023742 A6 | 2/1992 |
| JP | 2011514461 A | 5/2011 |
| KR | 200185870 Y1 | 6/2000 |
| KR | 20090099598 A | 9/2009 |
| KR | 20110116359 A | 10/2011 |
| WO | 2016193088 A1 | 12/2016 |

* cited by examiner

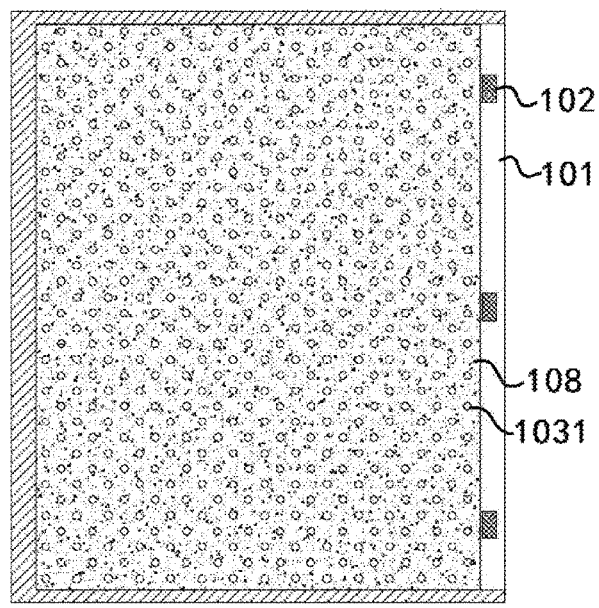
FIG.29
FIG.30
FIG.31
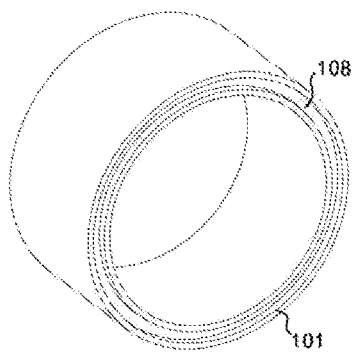
FIG.32
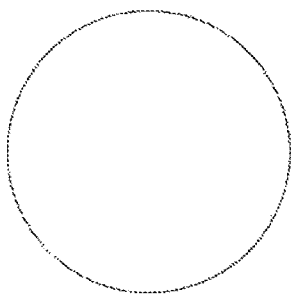
FIG.33

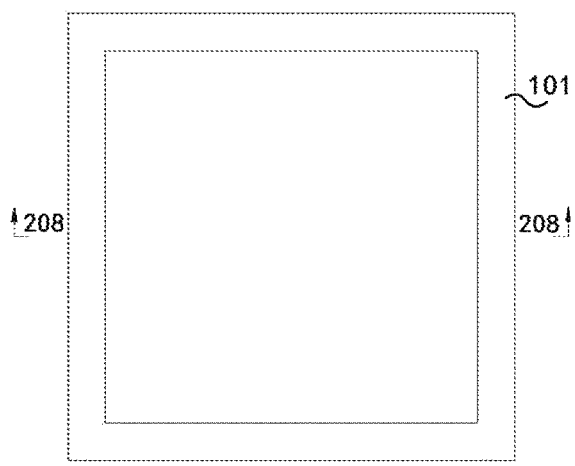
FIG.43
FIG.44
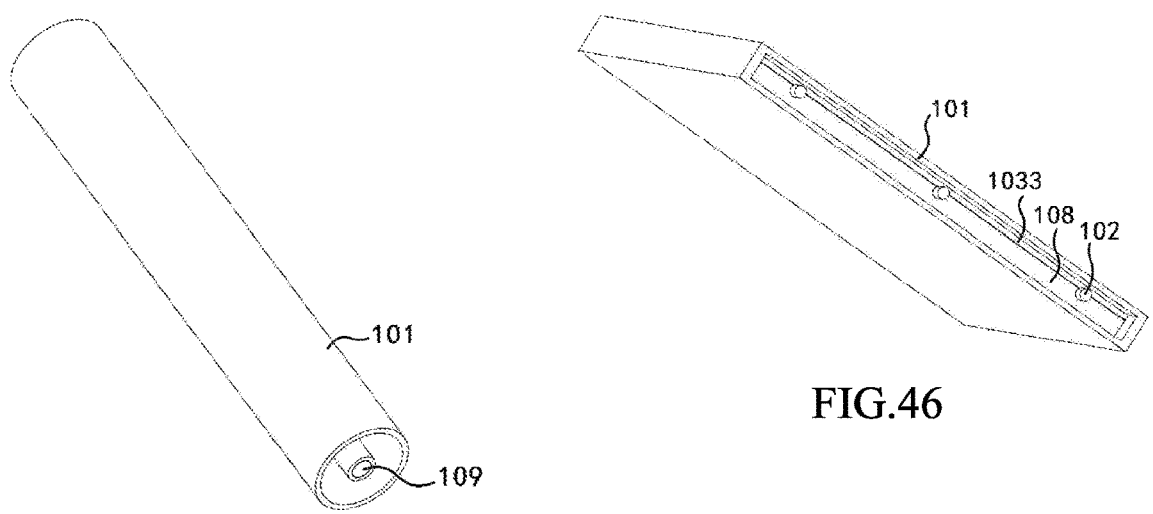
FIG.45
FIG.46

LUMINOUS STONE PRODUCT AND MANUFACTURING METHOD THEREFOR

CROSS-REFERENCE TO RELATED APPLICATIONS

The present application is a U.S. National Phase Application under 35 U.S.C. § 371 of International Application No. PCT/CN2019/121969 filed Nov. 29, 2019, which claims the priorities of the following applications:

the Chinese patent application CN201822016286.9 filed on Nov. 30, 2018, entitled "stone decorative panel";

the Chinese patent application CN201910298769.9 filed on Apr. 15, 2019, entitled "manufacturing method of light-transmittable stone decorative panel";

the Chinese patent application CN201921713262.7 filed on Oct. 12, 2019, entitled "luminous stone product";

the Chinese patent application CN201921709850.3 filed on Oct. 12, 2019, entitled "luminous stone product";

the entire contents of the aforementioned applications are herein incorporated by reference.

FIELD

The present invention relates to the field of building decoration, in particular to a luminous stone product.

BACKGROUND

The natural stone material has always been a high-end and beautiful decorative material, and the natural stone decorative panel having the light-transmitting effect is favored by consumers. In existing light transmitting natural stone decorative panels, an intaglio or counter-relief carving processing or overall buffing processing is usually adopted to reduce the thickness of the surface of the decorative panel to form a light transmitting side, and a light source is arranged at the back side of the light transmitting side to make the light transmitting side emit light. However, the light source is often a point light source, which is directly arranged at the back side of the light transmitting side, and the light emitted from the light transmitting side has a strong granular sensation, which affects the aesthetic appearance.

SUMMARY

An objective of the present invention is to overcome the above technical shortcomings, provide a luminous stone product, and solve the technical problem of strong granular sensation of the stone decorative panel in the prior art.

In order to achieve the above technical objective, the technical solution of the present invention provides a luminous stone product, characterized by including:

a natural stone panel including at least one cavity and at least one light transmitting side, wherein any of the cavities is correspondingly provided at the back side of the at least one light transmitting side, and any of the cavities extends to an edge of the natural stone panel and forms at least one opening;

a light source provided at the opening of the natural stone panel; and a light-guide board placed in the cavity and receiving light from the light source, wherein a gap between the light-guide board and the inner wall of the cavity is filled with a curable transparent adhesive resin.

Compared with the prior art, the present invention has the beneficial effect that the light-guide board is utilized to guide light, such that a point light source is changed into a planar light source which can emit light uniformly.

BRIEF DESCRIPTION OF THE DRAWINGS

FIG. 29 is a structural schematic view of the luminous stone product in the embodiment 18 of the present disclosure;

FIG. 30 is a cross-sectional view taken along the 204-204 line in FIG. 29;

FIG. 31 is a three-dimensional schematic view of a luminous stone product in an embodiment 20 of the present disclosure;

FIG. 32 is a three-dimensional schematic view of an embodiment of a stone product and a light transmitting layer in the present disclosure;

FIG. 33 is a structural schematic view of a luminous stone product in an embodiment 22 of the present disclosure;

FIG. 43 is a structural schematic view of a luminous stone product in the embodiment 33 of the present disclosure;

FIG. 44 is a cross-sectional view taken along the 208-208 line in FIG. 43;

FIG. 45 is a three-dimensional schematic view of a luminous stone product in an embodiment 34 of the present disclosure;

FIG. 46 is a three-dimensional schematic view of a luminous stone product in an embodiment 35 of the present disclosure;

DETAILED DESCRIPTION OF THE EMBODIMENTS

Figure 1:
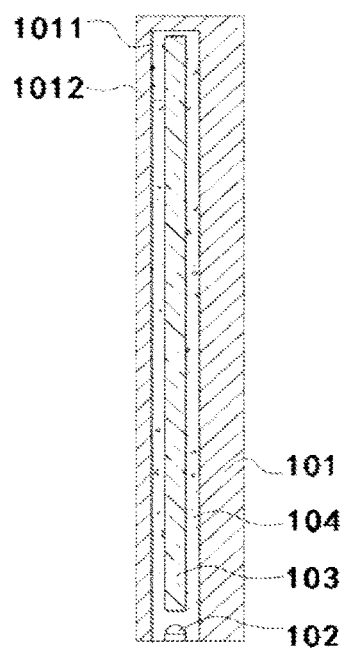
FIG. 1 is a schematic view of a first structure of a first embodiment (embodiment 1) of the present disclosure.

In order to make the objectives, technical solutions, and advantages of the present invention clearer and more understandable, the present invention is further illustrated in detail below with reference to the drawings and embodiments. It should be understood that the specific embodiments described herein are merely used for explaining the present invention, rather than limiting the present invention.

Embodiment 1

As shown in FIGS. 1 to 6, the present embodiment provides a stone decorative panel, including a natural stone panel 101, a light source 102, and a light-guide board 103, the natural stone panel 101 includes at least one cavity 1011 and at least one light transmitting side 1012, any of the cavities 1011 is correspondingly provided at the back side of the at least one light transmitting side 1012, and any of the cavities 1011 extends to an edge of the natural stone panel 101 and forms at least one opening. The natural stone panel 101 may be a natural stone product or a synthetic stone product. The natural stone panel 101 may be a whole piece of stone, or may be formed by splicing multiple pieces of stone. Preferably, the natural stone panel 101 is a natural stone product.

The cavity 1011 is a receptacle groove or recess formed by the natural stone panel 101 through inward depression, and the edge of the natural stone panel 101 is a side wall surrounding the light transmitting side 1012.

The light source 102 is provided at the opening of the natural stone panel 101.

The light-guide board 103 is placed in the cavity 1011 and acquires light from the light source 102, and a gap between the light-guide board 103 and the inner wall of the cavity 1011 is filled with a curable transparent adhesive resin 104.

When the depth and/or width of the cavity is/are less than 24.5 cm, the light-guide board 103 is formed by curing the curable transparent adhesive resin 104. When the depth and/or width of the cavity is/are less than 24.5 cm, the light source 102 directly irradiates the side of the light-guide board 103 formed by curing the transparent adhesive resin from the opening of the natural stone panel 101, which can meet the brightness requirement of a light emitting side.

When the stone decorative panel is manufactured, the following process steps may be adopted: firstly scratching out the cavity 1011 in a raw stone 117, then placing the light-guide board 103 into the cavity 1011, filling the gap in the cavity 1011 with the transparent adhesive resin 104, after the transparent adhesive resin 104 is cured, performing cutting on the surrounding of the cavity 1011 of the raw stone 117 to obtain a rough stone decorative panel, finally buffing the stone decorative panel, especially buffing the light transmitting side 1012 to a required thickness to obtain a finished stone decorative panel.

For the light-guide board, an optical grade acrylic/PC sheet material is employed, and then the bottom surface of the optical grade acrylic sheet material is printed with light guide points by means of a high-tech material having extra-high reflectivity and not absorbing light via laser engraving, V-shaped cross grid engraving and UV screen printing technology. The optical grade acrylic sheet material is employed to absorb light emitted from the lamp and the light will stay on the surface of the optical grade acrylic sheet material, when the ray of light irradiates each light guide point, the reflected light will diffuse at all angles, then the reflection condition is destroyed, and the reflected light is emitted from the front side of the light-guide board. By means of various light guide points with different density and different sizes, the light-guide board can emit light uniformly. The light-guide board may be other structures that can refract point light sources into planar light sources, or may be made of other materials that have the effect of refracting light sources.

When the light source 102 does not emit light, the front side of the natural stone panel 101 only shows the natural pattern of the stone itself; when the light source 102 emits light, the light is guided by the light-guide board 103 and emitted from the light emitting side of the light-guide board 103, that is, the point light source is changed into a planar light source, finally the light is transmitted through the light transmitting side 1012 of the natural stone panel 101, thereby showing a uniform light shape, and improving the aesthetic appearance. Furthermore, if the light-guide board 103 or the light transmitting side 1012 is designed into a desired shape, such as a pattern or logo, a corresponding light shape can be obtained, which enriches the light transmitting types and functions of the stone decorative panel. Since the light source 102 may be arranged at the periphery of the natural stone panel 101, it is convenient to maintain and replace the light source 102.

Figure 3:
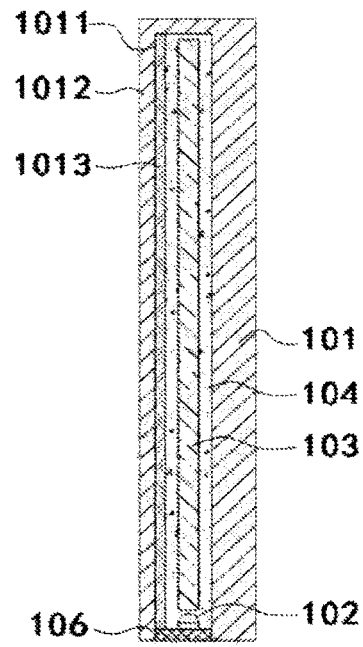
FIG. 3 is a schematic view of a third structure of the embodiment 1.

In order to optimize the light transmitting types and functions of the stone decorative panel, a further improvement is provided as follows: as shown in FIG. 3, in the cavity 1011, a pattern layer 1013 is arranged between the light-guide board 103 and the inner wall of the light transmitting side 1012. The pattern layer 1013 may be a light shielding panel, which plays a role in partially shielding the uniform planar light emitted by the light-guide board 103 to trim the light shape with the desired pattern or logo, and the light shape is finally shown on the light transmitting side 1012 of the natural stone panel 101.

Generally speaking, the main decorative side of the stone decorative panel is selected to be processed to obtain the light transmitting side 1012. The shape of the stone decorative panel will adaptively vary depending on the decoration area or decoration occasion.

The following three cases are taken as examples.

Figure 4:
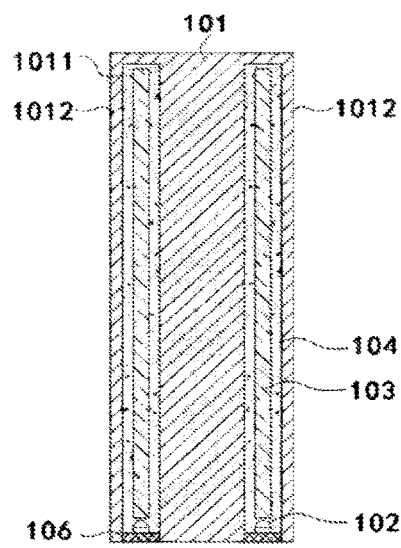
FIG. 4 is a schematic view of a fourth structure of the embodiment 1.
Figure 5:
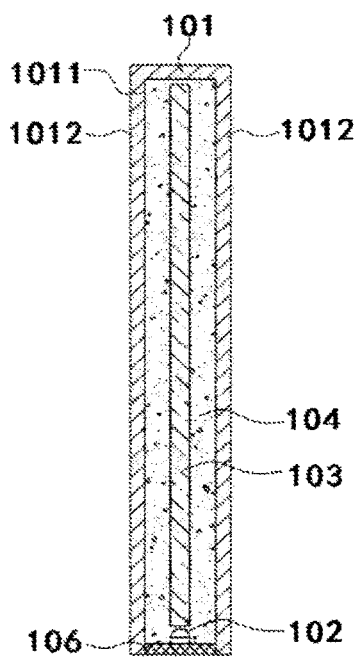
FIG. 5 is a schematic view of a fifth structure of the embodiment 1.
Figure 6:
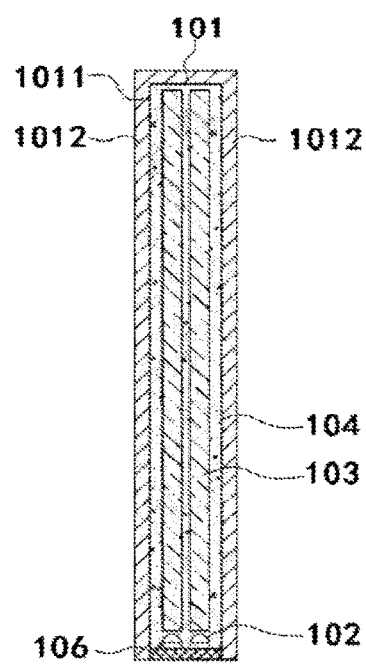
FIG. 6 is a schematic view of a sixth structure of the embodiment 1.
Figure 7:
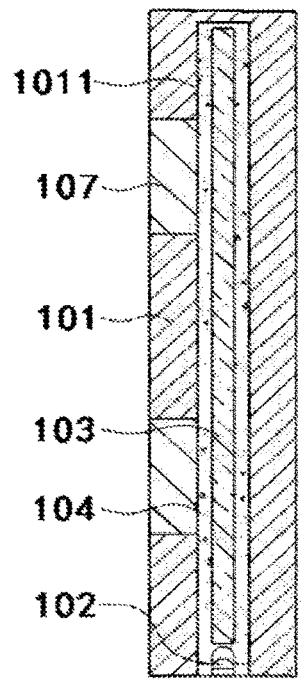
FIG. 7 is a schematic view of a first structure of an embodiment 2 of the present disclosure.

When the stone decorative panel is used as a wall tile or a similar structure thereof, the light transmitting side 1012 is the only one decorative side or a partial region in the decorative side. As shown in FIG. 1, the natural stone panel 101 herein is generally flat and has small thickness, and it only needs to include one cavity 1011 and one light transmitting side 1012. When the stone decorative panel is used as a screen or a similar structure thereof, both front and back faces of the stone panel are often decorative faces, the light transmitting sides 1012 may form both the front and rear decorative faces, or form partial regions in both the front and rear decorative faces. Due to the robustness requirements, the thickness of the stone decorative panel is usually thicker than that of the wall tile. As shown in FIG. 4, herein there are two light transmitting sides 1012 that are oppositely arranged and two corresponding cavities 1011, and two sets of light sources 102 and light-guide boards 103 in the two cavities 1011 respectively provide illumination for the corresponding light transmitting sides 1012. In order to meet special requirements and reduce the thickness, the following adjustment way may be adopted: as shown in FIG. 5, there are two light transmitting sides 1012 that are oppositely arranged and one cavity 1011 that is provided between the two light transmitting sides 1012, the two light transmitting sides 1012 share one cavity 1011, that is, a set of light source 102 and light-guide board 103 provide light for the two light transmitting sides 1012 at the same time, of course, in order to achieve different light supply requirements of the two light transmitting sides 1012, two sets of light sources 102 and light-guide boards 103 may be placed in the one cavity 1011, as shown in FIG. 6, which also reduces the thickness of the natural stone panel 101.

When the stone decorative panel is used as a column or a similar structure thereof, the stone decorative panel will have multiple decorative sides, the light transmitting sides 1012 are all the decorative sides or part of the decorative sides or partial regions in the decorative sides. The natural stone panel 101 herein generally does not have too many size restrictions, and it has many sides and abundant space. Therefore, herein the cavities 1011 correspond to the light transmitting sides 1012 in a one-to-one manner, thereby meeting the light transmission requirements of multiple decorative sides.

Figure 2:
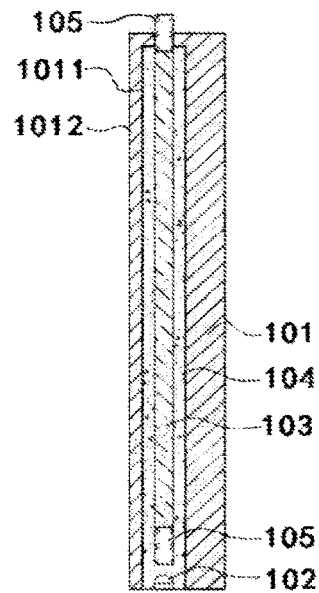
FIG. 2 is a schematic view of a second structure of the embodiment 1.

As an improved specific solution, as shown in FIG. 2, a light guide 105 is arranged between the light source 102 and the light-guide board 103. Due to the existence of the light guide 105, the arrangement position of the light source 102 is more flexible. On the basis of the foregoing solution, a hole communicated with the cavity 1011 and used for the placement of the light guide 105 may also be arranged in the periphery of the natural stone panel 101, such that the arrangement of the light guide 105 is flexible and diverse, and light acquisition points may also be increased to make the light-guide board emit more light; in addition, the hole may be in the form of a drill hole, and the drill hole may still be filled with a certain amount of transparent adhesive resin, the drill hole has little effect on the structural strength of the natural stone panel 101.

In order to make the structure of the stone decorative panel more compact and complete, a specific solution is provided as follows: the stone decorative panel further includes a cover 106 provided at the opening of the natural stone panel 101, the light source 102 is provided on the cover, as shown in FIGS. 3 to 6, the cover 106 not only plays a role in enclosing the opening of the natural stone panel 101, but also provides support for the light source 102.

In order to adapt to different decoration requirements, the surface of the natural stone panel 101 is a flat surface or a curved surface or a special-shaped surface, that is, the shape of the natural stone panel 101 may adaptively vary with the shape of the decoration, for example, when used to decorate the wall or the ground, the natural stone panel 101 generally adopts the shape and structure of a flat panel; for example, when used to decorate a circular cylinder, the natural stone panel 101 generally adopts the shape and structure of a curved panel.

The transparent adhesive resin 104 is one of epoxy resin adhesive, polyurethane adhesive, and unsaturated polyester resin adhesive. The transparent adhesive resin 104 using the aforementioned material may be cured, which can ensure that the natural stone panel 101 is not easily broken during the machining process including buffing and polishing and the using process, and the fact that the light is transmitted from the natural stone panel 101 to be visible is not affected. In addition, a photoluminescent material may also be mixed into the transparent adhesive resin 104. When the photoluminescent material is not excited to emit light, the natural stone panel 101 has a conventional decorative effect. When the photoluminescent material is excited to emit light, the outer surface of the natural stone panel 101 can emit luminous light, which increases the ornamental value and the additional value of the product. In the event of a sudden power failure, it will not be completely dark, thereby increasing the practicability.

Embodiment 2

As shown in FIGS. 7 to 11, the present embodiment provides a stone decorative panel, including a natural stone panel 101, a light source 102, and a light-guide board 103, the natural stone panel 101 includes at least one cavity 1011 and at least one stencil side, any of the cavities 1011 is correspondingly provided at the back side of the at least one stencil side, and any of the cavities 1011 extends to an edge of the natural stone panel 101 and forms at least one opening, and light transmitting stone filling blocks 107 are arranged at the stencil parts.

The cavity 1011 is a receptacle groove formed by the natural stone panel 101 through inward depression, and the edge of the natural stone panel 101 is a side wall surrounding the light transmitting side 1012.

The light source 102 is provided at the opening of the natural stone panel 101.

The cavity 1011 is a receptacle groove or recess formed by the natural stone panel 101 through inward depression, and the edge of the natural stone panel 101 is a side wall surrounding the light transmitting side 1012.

When the depth and/or width of the cavity is/are less than 24.5 cm, the light-guide board 103 is formed by curing the curable transparent adhesive resin. When the depth and/or width of the cavity is/are less than 24.5 cm, the light source 102 directly irradiates the side of the light-guide board 103 formed by curing the transparent adhesive resin from the opening of the natural stone panel 101, which can meet the brightness requirement of a light emitting side.

This embodiment 2 is basically the same as the embodiment 1, with the difference that the light transmitting side 1012 is modified to a stencil side, and light transmitting stone filling blocks 107 are arranged at the stencil parts to achieve the purpose of light transmission. The light shape is adjusted by changing the shape of the stencil parts and the shape of the light transmitting stone filling blocks 107 adapted to the stencil parts, so as to obtain the desired pattern or logo.

Figure 8:
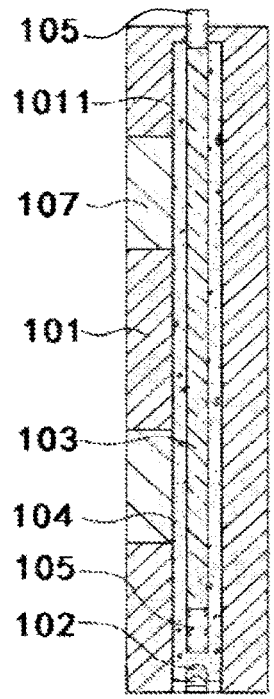
FIG. 8 is a schematic view of a second structure of the embodiment 2.
Figure 9:
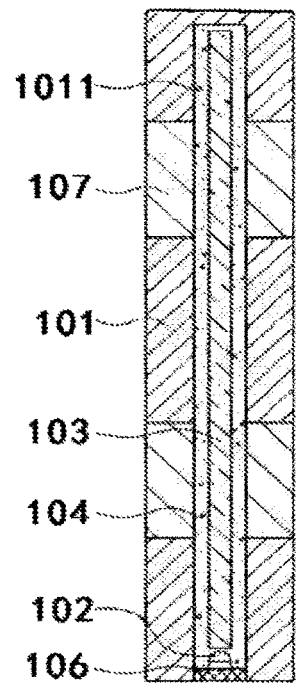
FIG. 9 is a schematic view of a third structure of the embodiment 2.
Figure 10:
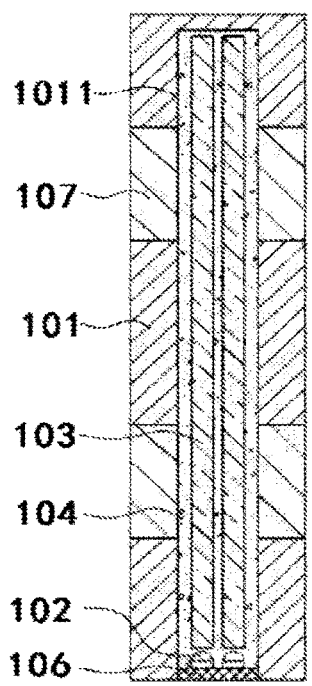
FIG. 10 is a schematic view of a fourth structure of the embodiment 2.
Figure 11:
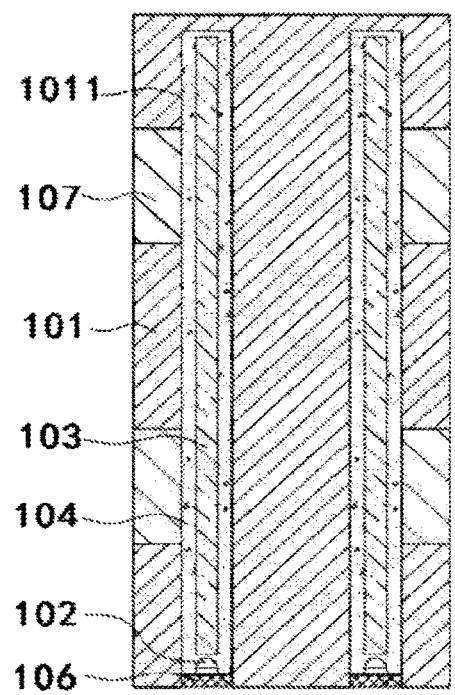
FIG. 11 is a schematic view of a fifth structure of the embodiment 2.

In this solution, the following optimization and improvement way may also be adopted: as shown in FIGS. 9 and 10, there are two stencil sides that are oppositely arranged and one cavity 1011 that is provided between the two stencil sides. The cavities 1011 correspond to the stencil sides in a one-to-one manner. As shown in FIG. 8, a light guide 105 is arranged between the light source 102 and the light-guide board 103. As shown in FIGS. 9 to 11, the stone decorative panel further includes a cover 106 provided at the opening of the natural stone panel 101, and the light source 102 is provided on the cover 106. The surface of the natural stone panel 101 is a flat surface or curved surface or special-shaped surface. The transparent adhesive resin 104 is one of epoxy resin adhesive, polyurethane adhesive, and unsaturated polyester resin adhesive.

A photoluminescent material is mixed into the transparent adhesive resin 104. The principle and beneficial effects of these improvements are all the same as those of embodiment 1, and will not be repeated here.

Embodiment 3

Figure 12:
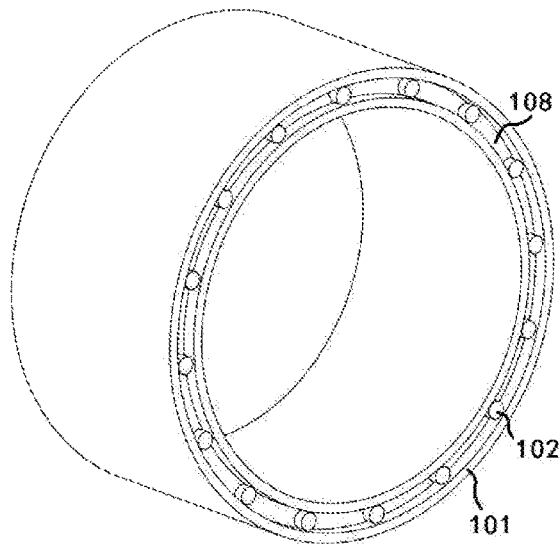
FIG. 12 is a three-dimensional schematic view of a luminous stone product in an embodiment 3 of the present disclosure.
Figure 13:
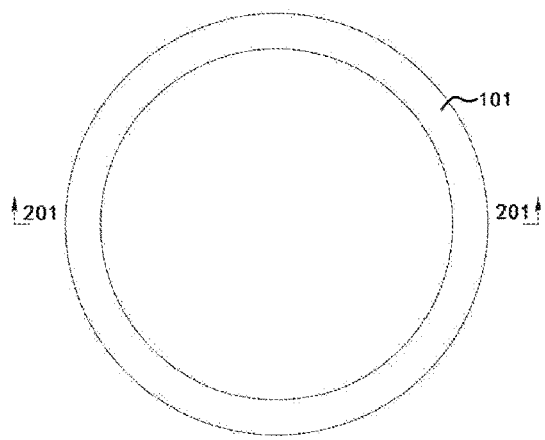
FIG. 13 is a structural schematic view of the luminous stone product in the embodiment 3.
Figure 14:
FIG. 14 is a cross-sectional view taken along the 201-201 line in FIG. 13.

As shown in FIGS. 12 to 14, the similarities between the embodiment 3 and the embodiment 1 will not be explained again, and the difference between the embodiment 3 and the embodiment 1 is that the cavity is formed by the natural stone panel 101 through inward depression, and the cavity is a receptacle groove.

The luminous stone product further includes light transmitting filler, which is built into the receptacle groove and forms a light transmitting layer 108, and the light transmitting layer 108 is arranged close to the light transmitting side; the light transmitting filler may be a colloidal-state light transmitting filler or a curable light transmitting filler, preferably, the light transmitting filler is a curable light transmitting filler, and more preferably, the light transmitting filler is a transparent adhesive resin, which is one of epoxy resin adhesive, polyurethane adhesive, and unsaturated polyester resin adhesive.

The light-guide board includes a plurality of first light-reflecting particles 1031, which are built into the light transmitting layer 108; the first light-reflecting particles 1031 may be various particles having light-reflecting effects, preferably, the first light-reflecting particles 1031 are uniformly built into the light transmitting layer 108, the first light-reflecting particles 1031 are submicron spherical silica micro powder having a particle size D50 of 0.5±0.1 μm or 1.0±0.2 μm and a spherical rate of greater than 95%, and the addition ratio of the first light-reflecting particles 1031 is 0.2-0.8%.

The light source 102 is arranged to face the light transmitting layer 108, and the number of the light source 102 is at least one. The light source 102 may be an LED lamp, an LED flexible light bar, an LED hard light bar, etc. Preferably, the light source 102 is an LED lamp.

When the light source 102 emits light, the ray of light emitted by the light source 102 irradiates into the light transmitting layer 108, such that when the ray of light contacts with the first light-reflecting particles 1031, it is reflected and refracted by the first light-reflecting particles 1031, such that the path of the ray of light changes. Since the number of the first light-reflecting particles 1031 is large enough, the ray of light is reflected and refracted differently in the light transmitting layer 108, such that the light transmitting layer 108 emits light throughout, the ray of light emitted from the light transmitting layer 108 passes through the inner wall of the receptacle groove and emitted from the light transmitting side of the natural stone panel 101, such that the natural stone panel 101 emits light.

Moreover, since the light transmitting filler and the first light-reflecting particles 1031 are uniformly mixed, then are built into the natural stone panel 101 and form a light transmitting layer 108. There is no air and gap between the light transmitting layer 108 and the inner wall of the receptacle groove, the light transmitting layer 108 conforming to the inner wall of the receptacle groove can support the natural stone panel 101 without affecting the structural strength of the natural stone panel 101.

The light transmitting layer 108 formed by the light transmitting filler may fill the receptacle groove, or may be arranged on the side of the receptacle groove close to the light transmitting side.

The natural stone panel 101 of the present embodiment may be a whole piece of stone, or may be formed by splicing multiple pieces of stone.

The machining flow of the luminous stone product of the present embodiment includes:

a step 1 of machining (cutting and/or polishing) the outer wall (end surface or side wall) of the natural stone panel 101 to obtain at least one receptacle groove through machining;

a step 2 of baking the inner wall of the receptacle groove;

a step 3 of mixing the first light-reflecting particles 1031 with the light transmitting filler uniformly and then injecting them into the receptacle groove;

a step 4 of machining (cutting and/or polishing) the outer surface of the natural stone panel 101;

a step 5 of fixing the light source 102 on the natural stone panel 101 such that the light source 102 faces the light transmitting layer 108.

Preferably, in the step 2, the natural stone panel 101 may also be dried by way of wind blowing, natural air drying, sun drying and the like.

Preferably, in the step 3, when the light transmitting filler is an adhesive resin, the subsequent processes are performed after the adhesive resin is cured and molded.

Preferably, the thickness of the natural stone panel 101 at the light transmitting part is 0.5 mm to 3.5 mm.

It is ensured that when the light source 102 does not irradiate the natural stone panel 101, the natural stone panel 101 appears to be an ordinary decoration, and the pattern formed by the light transmitting layer 108 is invisible; when the light source 102 irradiates the natural stone panel 101, the light transmitting layer 108 emits light, and the pattern formed by the light transmitting layer 108 is visible.

Embodiment 4

Figure 15:
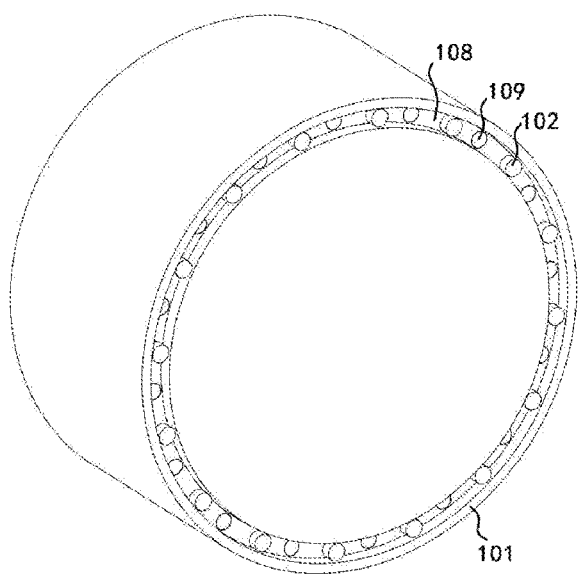
FIG. 15 is a three-dimensional schematic view of a luminous stone product in an embodiment 4 of the present disclosure.
Figure 16:
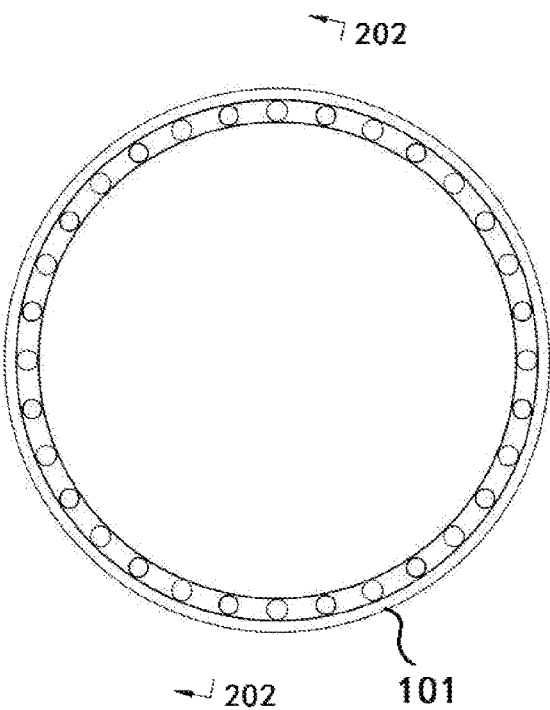
FIG. 16 is a structural schematic view of the luminous stone product in the embodiment 4.
Figure 17:
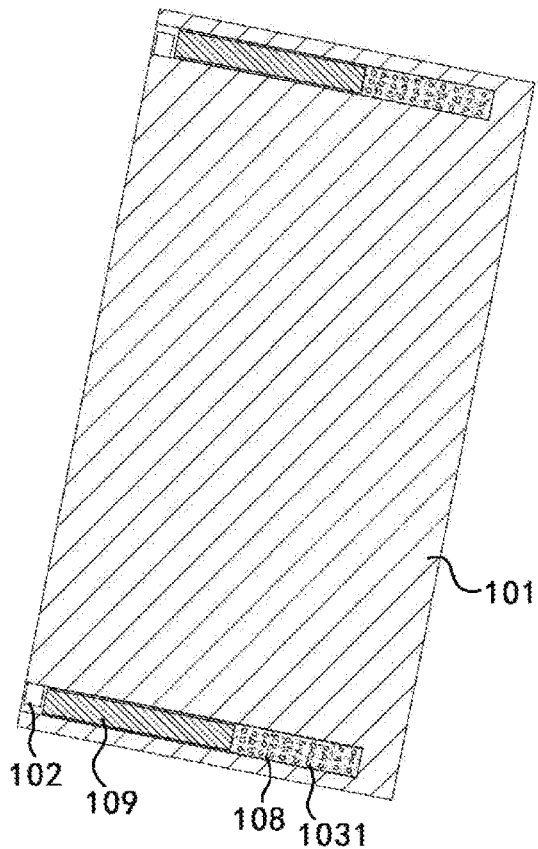
FIG. 17 is a cross-sectional view taken along the 202-202 line in FIG. 16.

As shown in FIGS. 15 to 17, the similarities between the embodiment 4 and the embodiment 3 will not be explained again, and the difference between the embodiment 4 and the embodiment 3 is that the luminous stone product further includes at least one light-guide column 109, which is built into the receptacle groove.

Preferably, there are a plurality of light-guide columns 109 that are arranged along the length direction of the receptacle groove, and the plurality of light-guide columns 109 are uniformly built into the receptacle groove.

More preferably, one end of the light-guide column 109 is inserted into the light transmitting layer 108.

More preferably, the light-guide columns 109 and the light sources 102 are alternately arranged along the circumferential direction of the receptacle groove.

By arranging the light-guide columns 109, when the light sources 102 emit light, part of the ray of light emitted by the light sources 102 enters the corresponding light-guide columns 109, and the light-guide columns 109 transmit the ray of light to the remote part of the light transmitting layer 108, such that the remote part of the light transmitting layer 108 emits light to avoid the condition that the light guide layer away from the light sources 102 is too dark, thereby making the entire light transmitting layer 108 emit light.

The ray of light emitted by the light source 102 may be white or of other colors, when one end of the light-guide column 109 close to the light source 102 shows the same color as the ray of light from the light source, the light transmitting side will show a predetermined colored pattern.

After the step 2, the light-guide columns 109 are built into the receptacle groove in a predetermined arrangement mode, and then the step 3 is performed, after the light transmitting filler is cured, the light-guide columns 109 are fixed in the receptacle groove.

Embodiment 5

Figure 18:
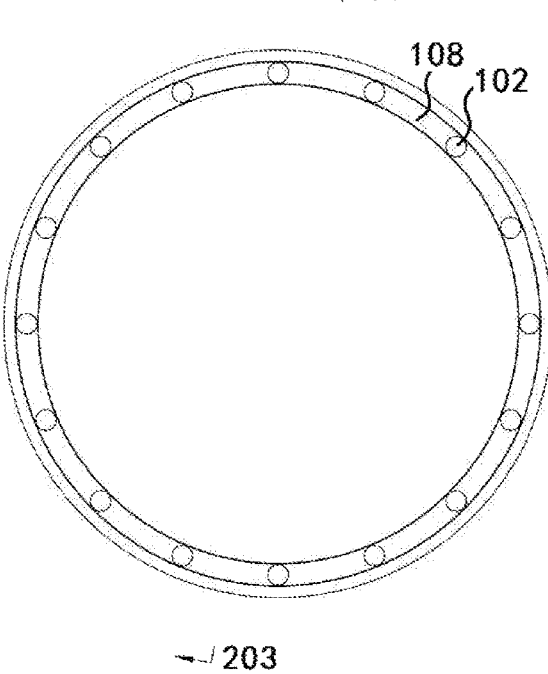
FIG. 18 is a structural schematic view of a luminous stone product in an embodiment 5 of the present disclosure.
Figure 19:
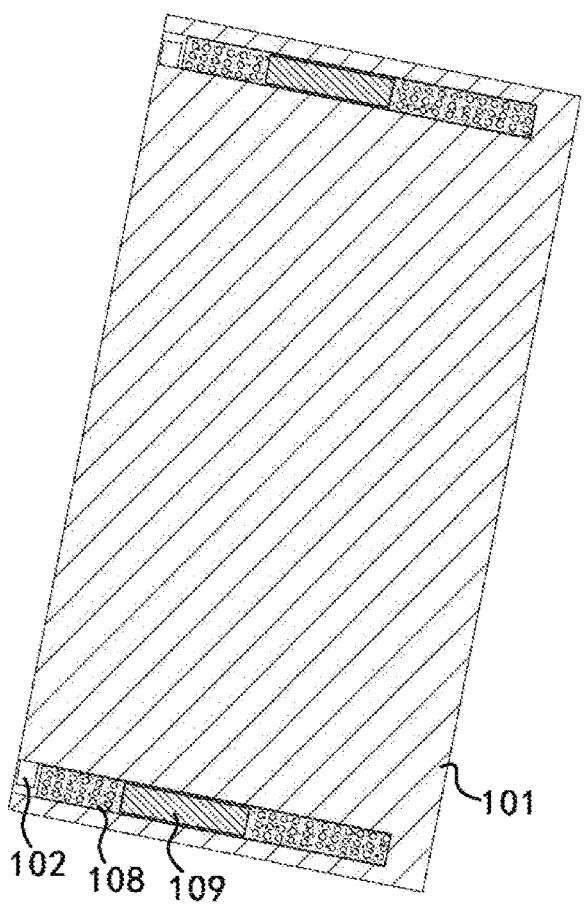
FIG. 19 is a cross-sectional view taken along the 203-203 line in FIG. 18.

As shown in FIGS. 18 and 19, the similarities between the embodiment 5 and the embodiment 4 will not be explained again, and the difference between the embodiment 5 and the embodiment 4 is that the light-guide columns 109 are built into the light transmitting layer 108.

After the ray of light emitted by the light sources 102 enters the light transmitting layer 108, part of the ray of light entering the light transmitting layer 108 is guided to the remote part of the light transmitting layer 108, such that the part of the light transmitting layer 108 away from the light sources 102 emits light.

Embodiment 6

Figure 20:
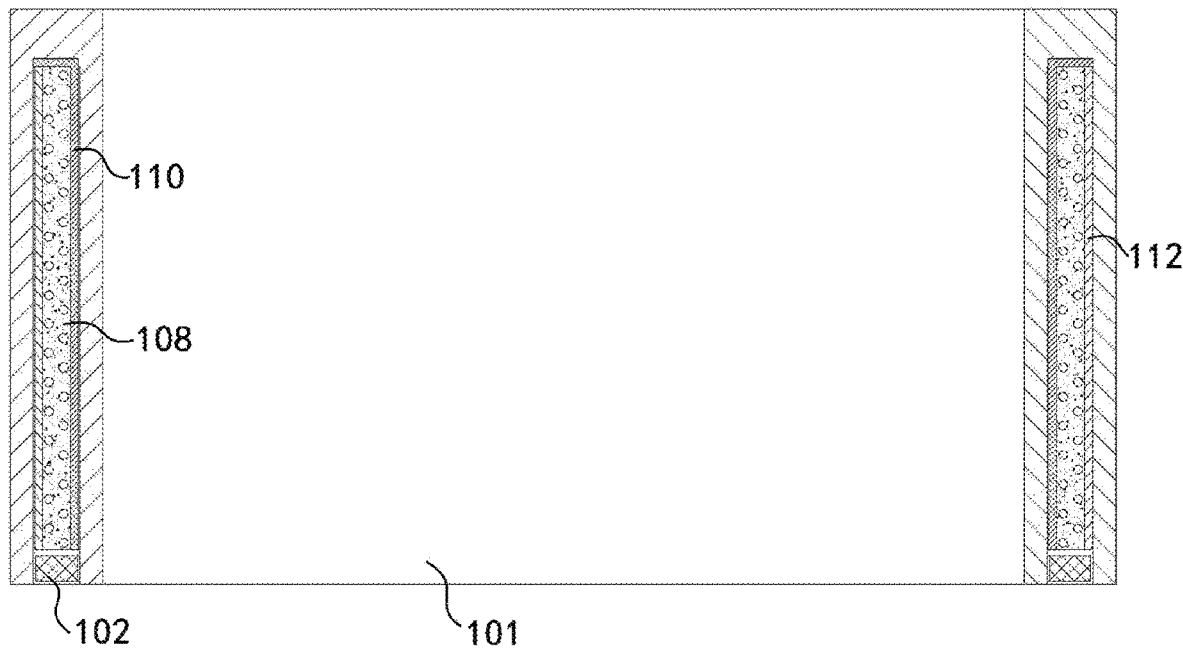
FIG. 20 is a structural schematic view of a luminous stone product in an embodiment 6 of the present disclosure.
Figure 21:
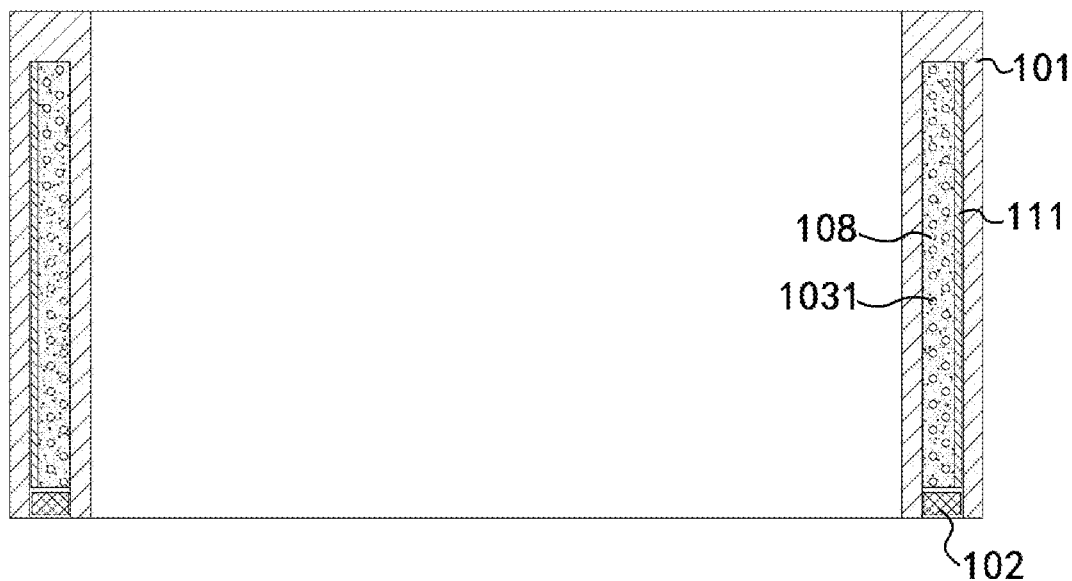
FIG. 21 is a structural schematic view of another embodiment of the luminous stone product in the embodiment 6.

As shown in FIGS. 20 and 21, the similarities between the embodiment 6 and the embodiment 3 will not be explained again, and the differences between the embodiment 6 and the embodiment 3 are that the luminous stone product further includes a light-reflecting layer 110, which is built into the receptacle groove and arranged on the side wall of the receptacle groove away from the light transmitting side, and the light-reflecting layer 110 may be a light-reflecting coating, aluminum plate, light-reflecting film, etc., more preferably, the light-reflecting layer 110 is a light-reflecting coating.

Since the first light-reflecting particles 1031 reflect the ray of light emitted by the light sources 102, the light transmitting layer 108 emits light throughout. By arranging the light-reflecting layer 110, the ray of light emitted from the light transmitting layer 108 can be reflected to the light transmitting side, such that a large amount of the ray of light is emitted from the light transmitting side, which is beneficial to improve the light-emitting brightness of the luminous natural stone panel 101.

Embodiment 7

The similarities between the embodiment 7 and the embodiment 3 will not be explained again, and the differences between the embodiment 7 and the embodiment 3 are that the luminous stone product further includes a light shielding layer 111, which is built into the receptacle groove and arranged between the light transmitting layer 108 and the inner wall of the receptacle groove, and at least one light transmitting zone is formed in the light shielding layer 111 and constitutes a pattern.

The ray of light emitted from the light transmitting layer 108 passes through the light transmitting zone of the light shielding layer 111, and the ray of light passes through the light shielding layer 111 from the light transmitting zone of the light shielding layer 111, and passes through the light transmitting side of the light shielding layer 111, such that the luminous natural stone panel 101 shows a predetermined pattern when emitting light.

The light shielding layer 111 may be a light-transmitting pigment or a partially light-transmitting sheet material, which can be obtained by directly searching for the finished products or by personal simple machining.

Before the step 3 is performed, the light transmitting layer 108 is built into the receptacle groove according to a predetermined design, and then the step 3 is performed.

Embodiment 8

Figure 22:
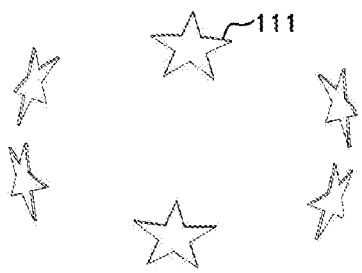
FIG. 22 is a three-dimensional schematic view of a light shielding layer in an embodiment 8 of the present disclosure.

As shown in FIG. 22, the similarities between the embodiment 8 and the embodiment 7 will not be explained again, and the difference between the embodiment 8 and the embodiment 7 is that a light transmitting zone is formed between the outer contour of the light shielding layer 111 and the inner wall of the receptacle groove and forms a pattern.

Embodiment 9

Figure 23:
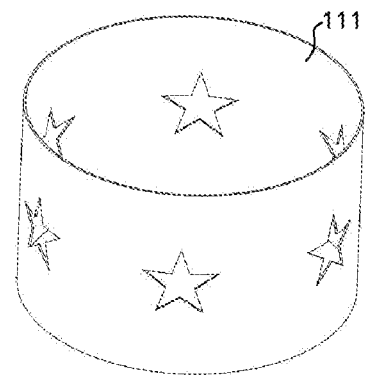
FIG. 23 is a three-dimensional schematic view of a light shielding layer in an embodiment 9 of the present disclosure.

As shown in FIG. 23, the similarities between the embodiment 9 and the embodiment 7 will not be explained again, and the difference between the embodiment 9 and the embodiment 7 is that the light shielding layer 111 is internally provided with at least one stencil part, which is a light transmitting zone and constitutes a pattern.

Embodiment 10

Figure 24:
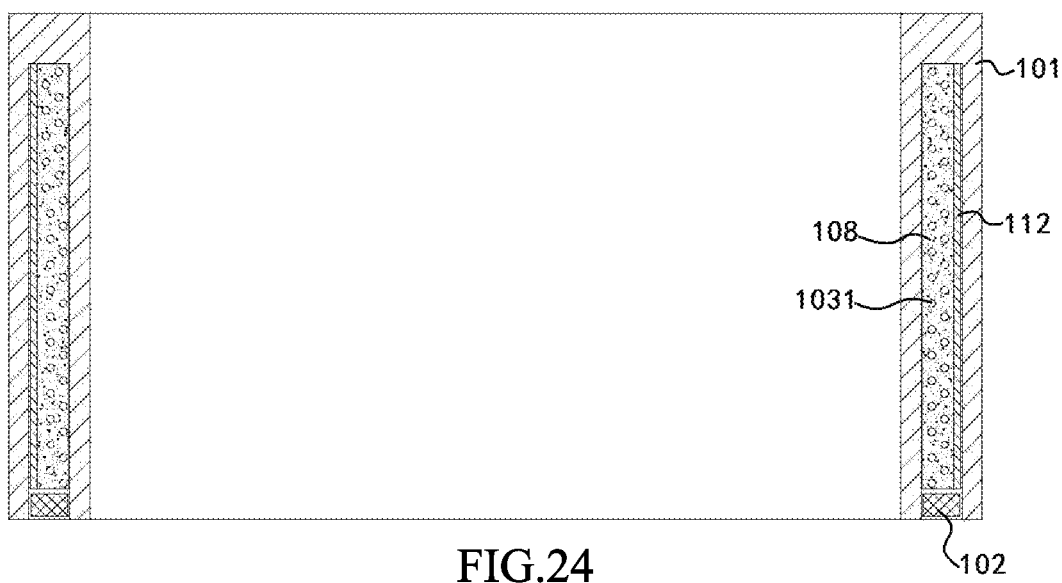
FIG. 24 is a structural schematic view of a luminous stone product in an embodiment 10 of the present disclosure.
Figure 25:
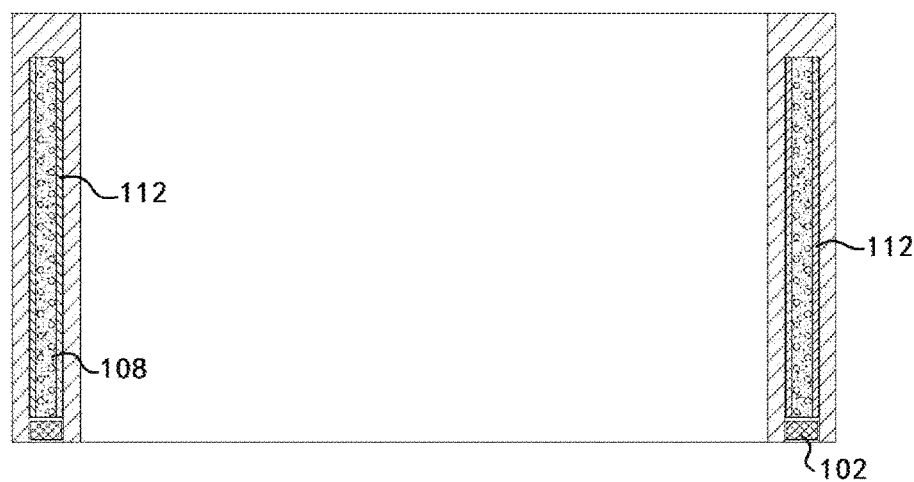
FIG. 25 is a structural schematic view of another embodiment of the luminous stone product in the embodiment 10 of the present disclosure.

As shown in FIGS. 24 and 25, the similarities between the embodiment 10 and the embodiment 3 will not be explained again, and the differences between the embodiment 10 and the embodiment 3 are that the luminous stone product further includes a light homogenizing layer 112, which is built into the receptacle groove and arranged between the light transmitting layer 108 and the inner wall of the receptacle groove.

Preferably, the light homogenizing layer 112 may be a frosted transparent coating or a frosted transparent film, etc., and more preferably, the light homogenizing layer 112 is a frosted transparent coating.

After the step 2, the light homogenizing layer 112 is painted on or built into the inner wall of the receptacle groove. The ray of light emitted from the light transmitting layer 108 may be partially over-bright or partially spotted, by arranging the light homogenizing layer 112, after passing through the light homogenizing layer 112, the ray of light can be scattered relatively more uniformly, thereby preventing bright spots from appearing in the light emitting zone of the luminous natural stone panel 101.

Embodiment 11

The similarities between the embodiment 11 and the embodiment 3 will not be explained again, and the difference between the embodiment 11 and the embodiment 3 is that the luminous stone product further includes light-transmittable colored filler, which is built into the light transmitting layer 108.

Preferably, the light-transmittable colored filler may be uniformly built into the light transmitting layer 108 or located locally in the light transmitting layer 108, and the light-transmittable colored filler is a light-transmitting colored pigment, which may be selected from one or a mixture of red, orange, yellow, green, cyan, blue and violet pigments.

The light-transmittable colored filler, the light transmitting filler, and the first light-reflecting particles 1031 are fully mixed and then injected into the receptacle groove, after the light transmitting layer 108 is cured, the whole light transmitting layer 108 exhibits in color or exhibits a predetermined colored pattern.

Embodiment 12

Figure 26:
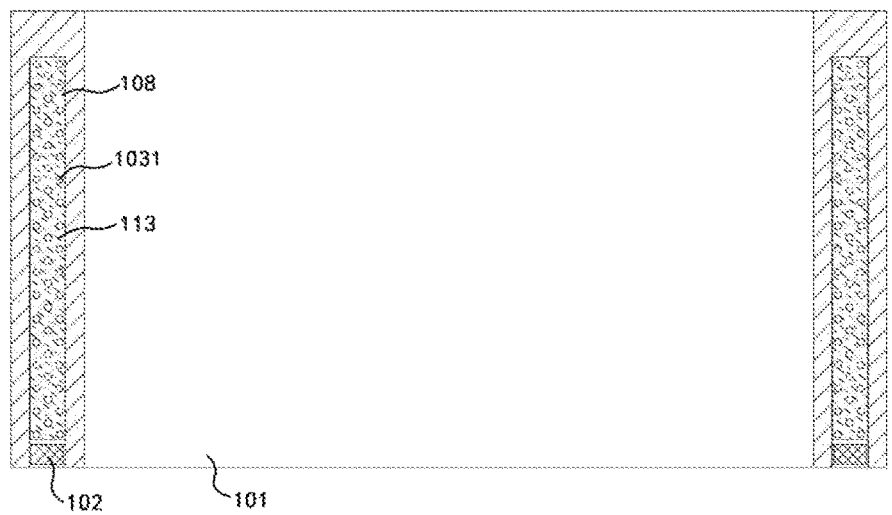
FIG. 26 is a three-dimensional schematic view of a luminous stone product in an embodiment 12 of the present disclosure.

As shown in FIG. 26, the similarities between the embodiment 12 and the embodiment 3 will not be explained again, and the differences between the embodiment 12 and the embodiment 3 are that the luminous stone product further includes a plurality of transparent fibers 113, which are uniformly built into the light transmitting layer 108, the transparent fibers 113 may be transparent resin fibers or transparent glass fibers, preferably, the transparent fibers 113 are transparent glass fibers, and the volume of the transparent fibers 113 accounts for less than 3% of the volume of the light transmitting layer 108.

The transparent fibers 113, the light transmitting filler and the first light-reflecting particles 1031 are fully mixed and then injected into the receptacle groove, after the light transmitting layer 108 is cured, the structural strength of the cured transparent layer can be improved, and the inner wall of the receptacle groove can be effectively supported.

The first light-reflecting particles 1031 may also be transparent fibers 113. When the transparent fibers 113 are in the light transmitting layer 108, it will refract the ray of light. When the first light-reflecting particles 1031 are transparent fibers 113, the transparent fibers 113 and the light transmitting filler are fully mixed and then injected into the receptacle groove, after the light transmitting layer 108 is cured, the structural strength of the cured transparent layer can be improved, the inner wall of the receptacle groove can be effectively supported, and normal light emission of the light transmitting layer 108 can also be achieved.

Embodiment 13

The similarities between the embodiment 13 and the embodiment 3 will not be explained again, and the differences between the embodiment 13 and the embodiment 3 are that the number of the receptacle groove is one, the receptacle groove is annular, and the receptacle groove may be circularly annular, quadrilateral, polygonal, or the like.

Preferably, the receptacle groove is circular ring-shaped.

Embodiment 14

Figure 27:
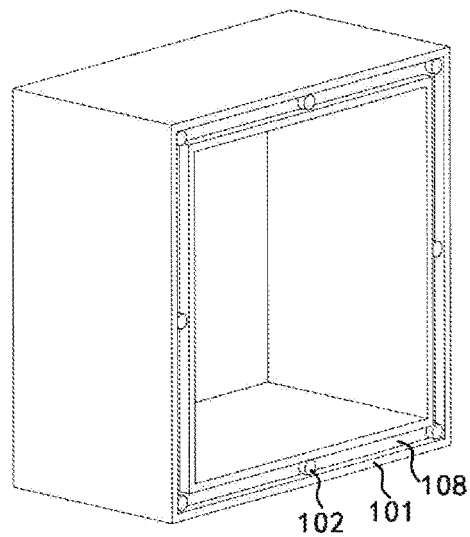
FIG. 27 is a three-dimensional schematic view of a luminous stone product in an embodiment 14 of the present disclosure.

As shown in FIG. 27, the similarities between the embodiment 14 and the embodiment 13 will not be explained again, and the difference between the embodiment 14 and the embodiment 13 is that the natural stone panel 101 is provided with a perforation hole, which is arranged coaxially with the natural stone panel 101, and arranged coaxially with the receptacle groove. The natural stone panel 101 may be a cylinder, a sphere, or an irregular geometry, etc., preferably, the natural stone panel 101 is cylindrical.

Embodiment 15

The similarities between the embodiment 15 and the embodiment 14 will not be explained again, and the difference between the embodiment 15 and the embodiment 14 is that the outer peripheral side of the natural stone panel 101 and the inner wall of the perforation hole are both light transmitting sides.

Embodiment 16

The similarities between the embodiment 16 and the embodiment 14 will not be explained again, and the differences between the embodiment 16 and the embodiment 14 are that one end of the cylindrical natural stone panel 101 is recessed inwards to form the receptacle groove, the receptacle groove is a blind hole, the outer peripheral side of the natural stone panel 101 is a light transmitting side, the luminous stone product further includes a light-reflecting layer 110, which is built into the receptacle groove, arranged on the side wall of the receptacle groove away from the light transmitting side, and arranged in the inner wall on the bottom of the receptacle groove, and the light-reflecting layer 110 may be a light-reflecting coating, aluminum plate, light-reflecting film, etc., more preferably, the light-reflecting layer 110 is a light-reflecting coating.

Embodiment 17

The similarities between the embodiment 17 and the embodiment 3 will not be explained again, and the difference between the embodiment 17 and the embodiment 3 is that one end of the natural stone panel 101 is recessed inwards to form the receptacle groove.

Embodiment 18

Figure 28:
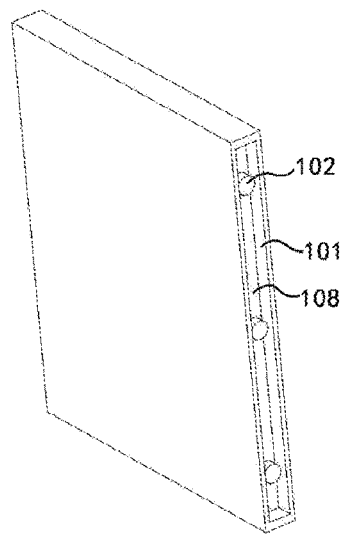
FIG. 28 is a three-dimensional schematic view of a luminous stone product in an embodiment 18 of the present disclosure.

As shown in FIGS. 28 to 30, the similarities between the embodiment 18 and the embodiment 3 will not be explained again, and the difference between the embodiment 18 and the embodiment 3 is that the side wall of the natural stone panel 101 is recessed inwards to form the receptacle groove.

Embodiment 19

The similarities between the embodiment 19 and the embodiment 3 will not be explained again, and the difference between the embodiment 19 and the embodiment 3 is that the light transmitting side of the natural stone panel 101 is provided with one or more of relief, counter-relief, and parquet.

Embodiment 20

As shown in FIG. 31, the similarities between the embodiment 20 and the embodiment 3 will not be explained again, and the differences between the embodiment 20 and the embodiment 3 are that the luminous stone product further includes an end cover 114 and cables 115, the end cover 114 is arranged to face the open end of the receptacle groove, and the end cover 114 is connected to the natural stone panel 101; the light sources 102 are built into the receptacle groove and arranged between the light transmitting layer 108 and the end cover 114; one end of each cable 115 passes through the end cover 114 and is electrically connected to each light source 102, and the locations where the cables 115 pass through the end cover 114 are sealed through an adhesive resin.

Preferably, the end cover 114 is annular, and the end cover 114 is connected to the natural stone panel 101 in a sealing manner through an adhesive resin.

Embodiment 21

The similarities between the embodiment 21 and the embodiment 3 will not be explained again, and the difference between the embodiment 21 and the embodiment 3 is that a photoluminescent material is mixed into the light transmitting layer 108.

When the photoluminescent material is not excited to emit light, the natural stone panel 101 has a conventional decorative effect; when the photoluminescent material is excited to emit light, the natural stone panel 101 can emit luminous light, which increases the ornamental value and the additional value of the product; and in the event of a sudden power failure, it will not be completely dark, which increases the practicability.

Embodiment 22

Figure 34:
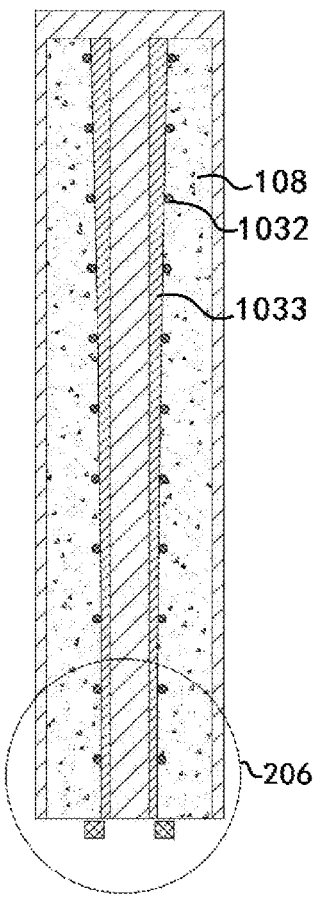
FIG. 34 is a cross-sectional view of the product of FIG. 33, taken along the line 205-205.

As shown in FIGS. 33 and 34, the similarities between the embodiment 22 and the embodiment 3 will not be explained again, and the differences between the embodiment 22 and the embodiment 3 are that the light-guide board 103 further includes a fixing layer 1033, which is built into the receptacle groove, the fixing layer 1033 includes a fixing face and a backlight face arranged opposite to the fixing face, and the fixing face is a side face of the fixing layer 1033 close to the light transmitting side; and the first light-reflecting particles 1031 are light-reflecting protrusions 1032, which are arranged on the fixing face.

The luminous stone product further includes a light transmitting filler, which is filled in the receptacle groove and forms a light transmitting layer 108, and the light transmitting layer 108 wraps the light-reflecting protrusions 1032; preferably, the light transmitting layer 108 wraps each light-reflecting protrusion 1032.

The light transmitting filler may fill the gap between the inner wall of the receptacle groove and the fixing layer 1033, or may fill a part of the gap in the receptacle groove, preferably, the light transmitting filler fills the gap between the inner wall of the receptacle groove and the fixing layer 1033.

The light transmitting filler may be colloidal-state light transmitting filler or curable light transmitting filler, preferably, the light transmitting filler is curable light transmitting filler, and more preferably, the light transmitting filler is a transparent adhesive resin, which is one of epoxy resin adhesive, polyurethane adhesive, and unsaturated polyester resin adhesive.

Since the light transmitting filler fills the receptacle groove and then forms a light transmitting layer 108, the light transmitting layer 108 fixes the light-reflecting protrusions 1032 and the fixing layer 1033 together, and can effectively support the inner wall of the receptacle groove, when the outer wall of the natural stone panel 101 is subsequently machined, due to the existence of the light transmitting layer 108, the structural strength of the natural stone panel 101 can be ensured, which is convenient for subsequent machining.

The light sources 102 are arranged to face the light transmitting layer. The light sources 102 may be LED lamps, LED flexible light bars, LED hard light bars, etc., preferably, the light sources 102 are LED lamps, and the number of the light sources 102 may be one, two, multiple, etc., preferably, the number of the light sources 102 is multiple, and the number of the light sources 102 may be set as required.

When the light sources 102 emit light, the ray of light emitted by the light sources 102 irradiates into the receptacle groove and into the light transmitting layer 108, the ray of light passes through the light transmitting layer 108 and irradiates to the light-reflecting protrusions 1032, such that the ray of light is reflected and refracted, thereby changing path of the ray of light. Since the number of the light-reflecting protrusions 1032 is large enough, a large amount of the ray of light can be reflected towards the inner wall of the receptacle groove, passes through the inner wall of the receptacle groove and is emitted from the light transmitting side of the natural stone panel 101, such that the natural stone panel 101 emits light, and can have a better light-reflecting effect under the combined action of the light transmitting layer and the light-reflecting protrusions.

The machining flow of the luminous stone product of the present embodiment includes:

a step 1 of machining (cutting and/or polishing) the outer wall (end surface or side wall) of the natural stone panel 101 to obtain at least one receptacle groove through machining;

a step 2 of baking the inner wall of the receptacle groove;

a step 3 of building a fixing layer 1033 with a plurality of light-reflecting protrusions 1032 into the receptacle groove;

a step 4 of injecting the light transmitting filler into the receptacle groove, and performing subsequent operations after the light transmitting filler is cured;

a step 5 of machining (cutting and/or polishing) the outer surface of the natural stone panel 101;

a step 6 of fixing the light source 102 on the natural stone panel 101 such that the light source 102 faces the light transmitting layer 108.

Preferably, in the step 2, the natural stone panel 101 may also be dried by way of wind blowing, natural air drying, sun drying and the like.

Preferably, the thickness of the natural stone panel 101 at the light transmitting part is 0.5 mm to 3.5 mm.

Preferably, in the process of arranging the light-guide board in the slit, when the depth and/or width of the receptacle groove is less than 24.5 cm, the curable transparent adhesive resin 104 is filled into the receptacle groove and is cured to form the light-guide board 103.

It is ensured that when the light source 102 does not irradiate the natural stone panel 101, the natural stone panel 101 appears to be an ordinary decoration, and the pattern formed by the light transmitting layer 108 is invisible; and when the light source 102 irradiates the natural stone panel 101, the light-reflecting protrusions 1032 reflect the ray of light, such that the ray of light passes through the inner wall of the receptacle groove and a pattern corresponding to the receptacle groove is formed.

Embodiment 23

The similarities between the embodiment 23 and the embodiment 22 will not be explained again, and the differences between the embodiment 23 and the embodiment 22 are that the fixing face is a light-reflecting face, the fixing layer 1033 may be a light-reflecting coating, aluminum plate, light-reflecting film, etc., and more preferably, the fixing layer 1033 is an aluminum plate, such that the light-reflecting face reflects light, and the fixing layer 1033 may be a flat plate or rotating body, frame, etc.

By setting the fixing face as a light-reflecting face, the ray of light irradiated to the light-reflecting face can be reflected, and this part of the ray of light is reflected to the light-reflecting protrusions 1032 and the inner wall of the receptacle groove, a large amount of the ray of light passes through the inner wall of the receptacle groove, and the luminous brightness of the stone panel a can be improved.

Embodiment 24

The similarities between the embodiment 24 and the embodiment 23 will not be explained again, and the difference between the embodiment 24 and the embodiment 23 is that the light-reflecting face is embossed outwards to form the light-reflecting protrusions 1032.

The light-reflecting protrusions 1032 may be in the shape of an irregular geometry with multiple light-reflecting faces on the outer surface, or a sphere or the like.

Embodiment 25

The similarities between the embodiment 25 and the embodiment 23 will not be explained again, and the difference between the embodiment 25 and the embodiment 23 is that the light-reflecting protrusions 1032 are light-reflecting glass beads, and the light-reflecting glass beads are connected to the light-reflecting face.

Preferably, the light-reflecting glass beads are pasted on the light-reflecting face through a transparent adhesive resin, and the transparent adhesive resin is one of epoxy resin adhesive, polyurethane adhesive, and unsaturated polyester resin adhesive.

Embodiment 26

As shown in FIG. 33, the similarities between the embodiment 26 and the embodiment 23 will not be explained again, and the difference between the embodiment 26 and the embodiment 23 is that the light-reflecting face is curved towards a direction close to the light transmitting side along a direction away from the light source 102.

Embodiment 27

Figure 35:
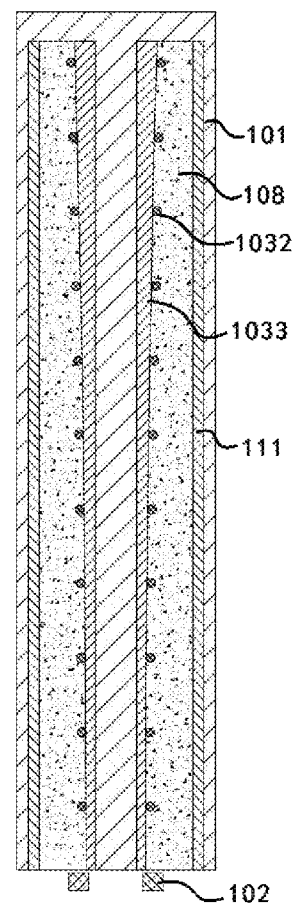
FIG. 35 is a structural schematic view of a luminous stone product in an embodiment 27 of the present disclosure.
Figure 36:
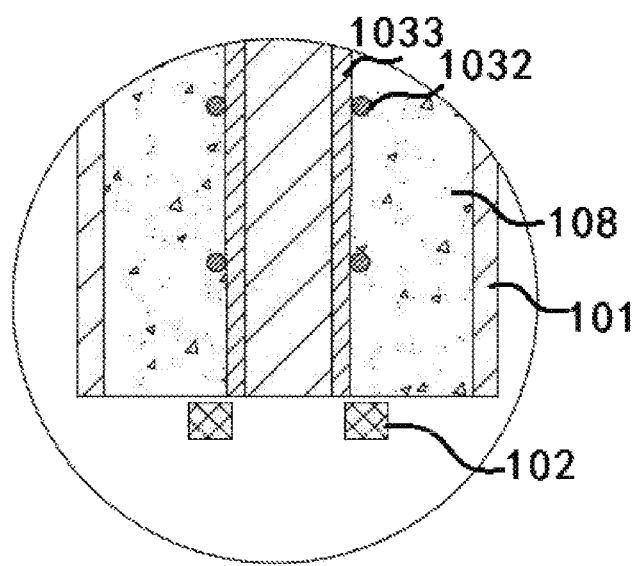
FIG. 36 is a partial enlarged schematic view of a position 206 in FIG. 34.

As shown in FIGS. 35 and 36, the similarities between the embodiment 27 and the embodiment 22 will not be explained again, and the differences between the embodiment 27 and the embodiment 22 are that the luminous stone product further includes a light shielding layer 111, which is built into the receptacle groove and arranged between the light transmitting layer 108 and the inner wall of the receptacle groove, and at least one light transmitting zone is formed in the light shielding layer 111 and constitutes a pattern.

The ray of light emitted from the light transmitting layer 108 passes through the light transmitting zone of the light shielding layer 111, and the ray of light passes through the light shielding layer 111 from the light transmitting zone of the light shielding layer 111 and passes through the light transmitting side of the light shielding layer 111, such that the luminous stone product exhibits a predetermined pattern when emitting light.

The light shielding layer 111 may be a light-transmitting pigment or a partially light-transmitting sheet material, which can be obtained by directly searching for the finished products or by personal simple machining.

Before the step 4 is performed, the light transmitting layer 108 is built into the receptacle groove according to a predetermined design, and then the step 4 is performed.

Embodiment 28

Figure 37:
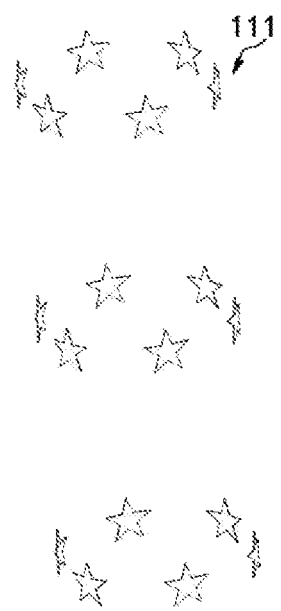
FIG. 37 is a structural schematic view of a light shielding layer in an embodiment 28 of the present disclosure.

As shown in FIG. 37, the similarities between the embodiment 28 and the embodiment 22 will not be explained again, and the difference between the embodiment 28 and the embodiment 22 is that a light transmitting zone is formed between the outer contour of the light shielding layer 111 and the inner wall of the receptacle groove and forms a pattern.

Embodiment 29

Figure 38:
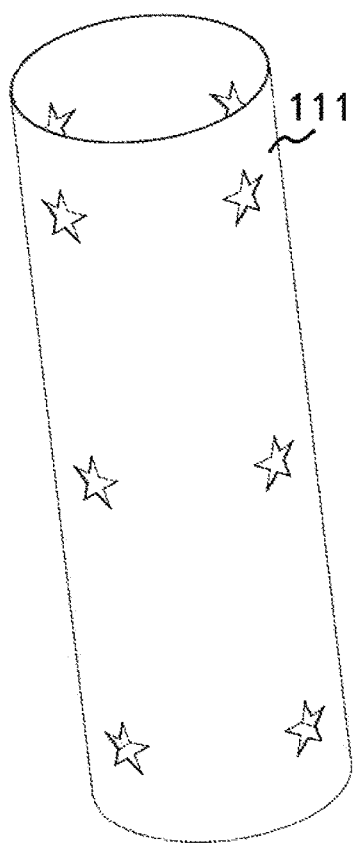
FIG. 38 is a structural schematic view of a light shielding layer in an embodiment 29 of the present disclosure.

As shown in FIG. 38, the similarities between the embodiment 29 and the embodiment 22 will not be explained again, and the difference between the embodiment 29 and the embodiment 22 is that the light shielding layer 111 is internally provided with at least one stencil part, and the stencil part is a light transmitting zone and constitutes a pattern.

Embodiment 30

Figure 39:
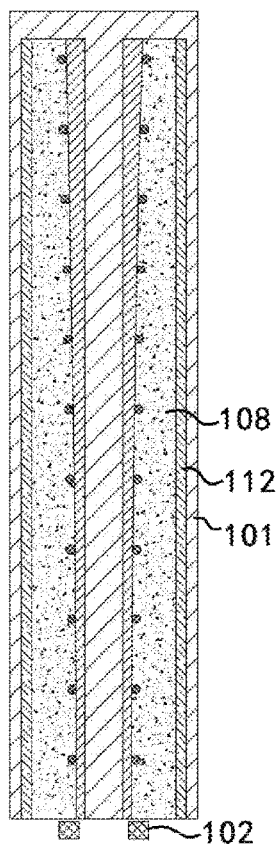
FIG. 39 is a structural schematic view of a luminous stone product in an embodiment 30 of the present disclosure.

As shown in FIG. 39, the similarities between the embodiment 30 and the embodiment 22 will not be explained again, and the difference between the embodiment 30 and the embodiment 22 is that the luminous stone product further includes a light homogenizing layer 112, which is built into the receptacle groove and arranged between the light transmitting layer 108 and the inner wall of the receptacle groove, and the light homogenizing layer 112 conforms to the inner wall of the receptacle groove.

Preferably, the light transmitting layer 108 fills the gap between the light homogenizing layer 112 and the fixing layer 1033.

Preferably, the light homogenizing layer 112 may be a frosted transparent coating or a frosted transparent film, etc., and more preferably, the light homogenizing layer 112 is a frosted transparent coating.

After the step 2, the light homogenizing layer 112 is painted on or built into the inner wall of the receptacle groove. The ray of light emitted from the light transmitting layer 108 may be partially over-bright or partially spotted, by arranging the light homogenizing layer 112, after passing through the light homogenizing layer 112, the ray of light can be scattered relatively more uniformly, thereby preventing bright spots from appearing in the light emitting zone of the luminous stone product.

Embodiment 31

The similarities between the embodiment 31 and the embodiment 22 will not be explained again, and the difference between the embodiment 31 and the embodiment 22 is that the luminous stone product further includes light-transmittable colored filler, which is built into the light transmitting layer 108.

Preferably, the light-transmittable colored filler may be uniformly built into the light transmitting layer 108 or located locally in the light transmitting layer 108, and the light-transmittable colored filler is a light-transmitting colored pigment, which may be one or a mixture of red, orange, yellow, green, cyan, blue and violet pigments.

The light-transmittable colored filler, the light transmitting filler, and the light-reflecting particles are fully mixed and then injected into the receptacle groove, after the light transmitting layer 108 is cured, the whole light transmitting layer 108 exhibits in color or exhibits a predetermined colored pattern.

Embodiment 32

Figure 40:
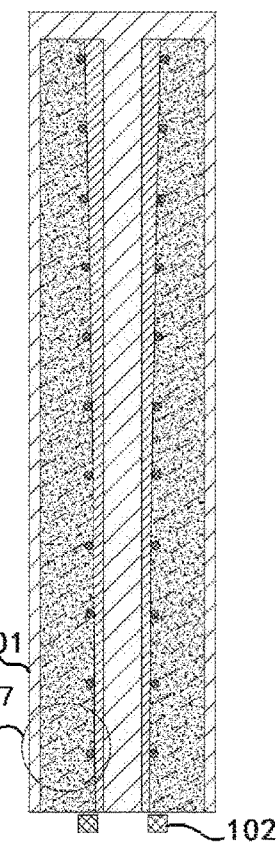
FIG. 40 is a structural schematic view of a luminous stone product in an embodiment 32 of the present disclosure.
Figure 41:
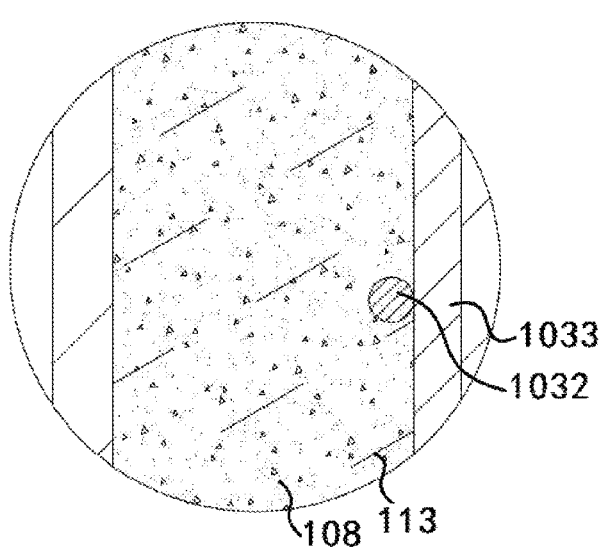
FIG. 41 is a partial enlarged schematic view of a position 207 in FIG. 40.

As shown in FIGS. 40 and 41, the similarities between the embodiment 32 and the embodiment 22 will not be explained again, and the differences between the embodiment 32 and the embodiment 22 are that the luminous stone product further includes a plurality of transparent fibers 113, which are uniformly built into the light transmitting layer 108, the transparent fibers 113 may be transparent resin fibers or transparent glass fibers, preferably, the transparent fibers 113 are transparent glass fibers, and the volume of the transparent fibers 113 accounts for less than 3% of the volume of the light transmitting layer 108.

The transparent fibers 113 and the light transmitting filler are fully mixed and then injected into the receptacle groove, after the light transmitting layer 108 is cured, the structural strength of the cured transparent layer can be improved, and the inner wall of the receptacle groove can be effectively supported.

When the transparent fibers 113 are in the light transmitting layer 108, it will refract the ray of light, the structural strength of the cured transparent layer can be improved, the inner wall of the receptacle groove can be effectively supported, and light emission of the light transmitting layer 108 can also be achieved.

Embodiment 33

Figure 42:
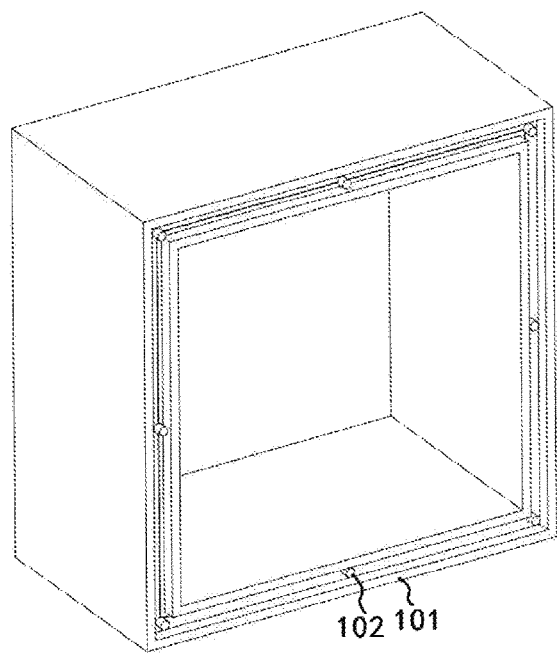
FIG. 42 is a three-dimensional schematic view of a luminous stone product in an embodiment 33 of the present disclosure.

As shown in FIGS. 42, 43 and 44, the similarities between the embodiment 33 and the embodiment 22 will not be explained again, and the difference between the embodiment 33 and the embodiment 22 is that the number of the receptacle groove is one, the receptacle groove is annular, and the receptacle groove may be annular, circular, quadrilateral, polygonal, or the like.

Preferably, the receptacle groove is circular, and the light sources 102 are uniformly distributed along the circumferential direction of the receptacle groove.

Embodiment 34

As shown in FIG. 45, the similarities between the embodiment 34 and the embodiment 22 will not be explained again, and the difference between the embodiment 34 and the embodiment 22 is that one end of the natural stone panel 101 is recessed inwards to form the receptacle groove.

Embodiment 35

Figure 47:
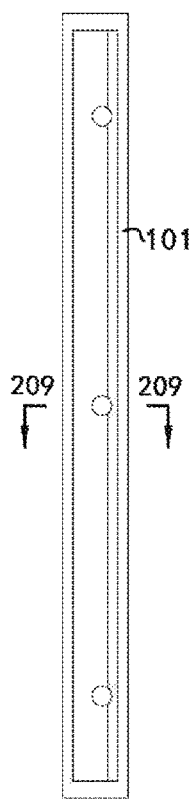
FIG. 47 is a structural schematic view of a luminous stone product in the embodiment 35 of the present disclosure.
Figure 48:
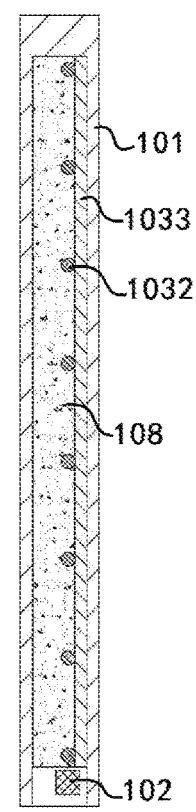
FIG. 48 is a cross-sectional view taken along the 209-209 line in FIG. 47.

As shown in FIGS. 46, 47 and 48, the similarities between the embodiment 35 and the embodiment 22 will not be explained again, and the difference between the embodiment 35 and the embodiment 22 is that the side wall of the natural stone panel 101 is recessed inwards to form the receptacle groove.

Embodiment 36

The similarities between the embodiment 36 and the embodiment 22 will not be explained again, and the difference between the embodiment 36 and the embodiment 22 is that the light transmitting side of the natural stone panel 101 is provided with one or more of relief, counter-relief, and parquet.

Embodiment 37

Figure 49:
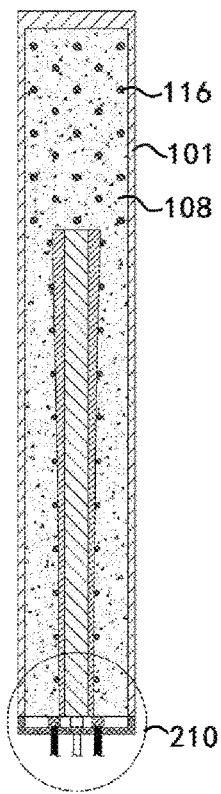
FIG. 49 is a structural schematic view of a luminous stone product in an embodiment 37 of the present disclosure.
Figure 51:
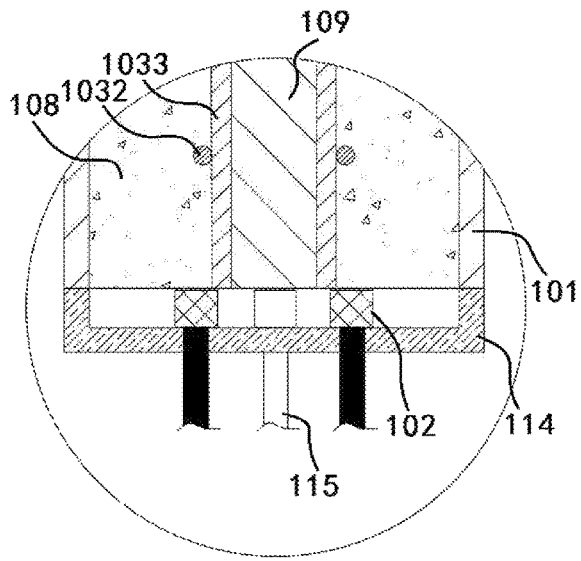
FIG. 51 is a partial enlarged schematic view of a position 210 in FIG. 49.

As shown in FIGS. 49 and 51, the similarities between the embodiment 37 and the embodiment 22 will not be explained again, and the differences between the embodiment 37 and the embodiment 22 are that the luminous stone product further includes an end cover 114 and cables 115, the end cover 114 is arranged to face the open end of the receptacle groove, and the end cover 114 is connected to the natural stone panel 101; the light sources 102 are built into the receptacle groove and arranged between the light transmitting layer 108 and the end cover 114; one end of each cable 115 passes through the end cover 114 and is electrically connected to each light source 102, and the locations where the cables 115 pass through the end cover 114 are sealed through an adhesive resin.

Preferably, the end cover 114 is connected to the natural stone panel 101 in a sealing manner through an adhesive resin.

Embodiment 38

The similarities between the embodiment 38 and the embodiment 22 will not be explained again, and the difference between the embodiment 38 and the embodiment 22 is that a photoluminescent material is mixed into the light transmitting layer 108.

When the photoluminescent material is not excited to emit light, the natural stone panel 101 has a conventional decorative effect; when the photoluminescent material is excited to emit light, the natural stone panel 101 can emit luminous light, which increases the ornamental value and the additional value of the product; and in the event of a sudden power failure, it will not be completely dark, which increases the practicability.

Embodiment 39

Figure 50:
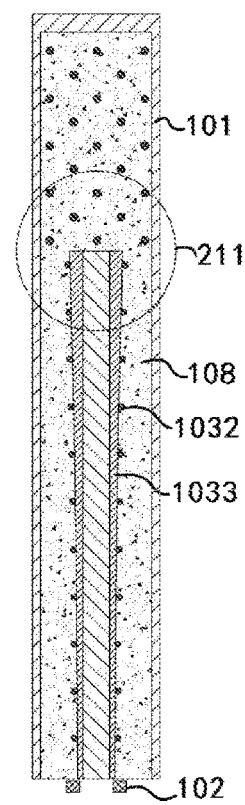
FIG. 50 is a structural schematic view of a luminous stone product in an embodiment 39 of the present disclosure.
Figure 52:
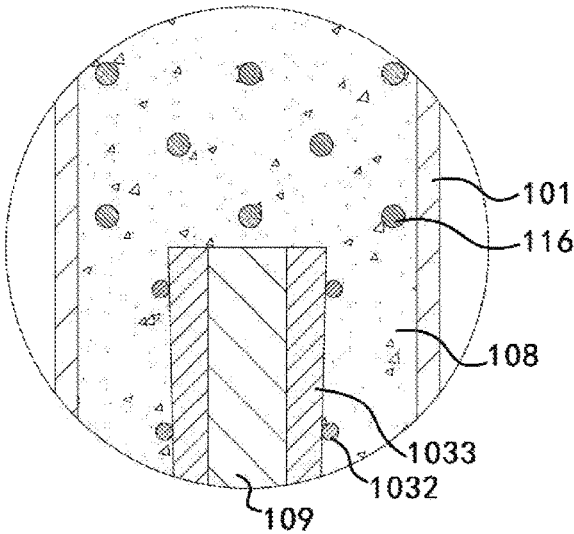
FIG. 52 is a partial enlarged schematic view of a position 211 in FIG. 50.

As shown in FIGS. 50 and 52, the similarities between the embodiment 39 and the embodiment 22 will not be explained again, and the differences between the embodiment 39 and the embodiment 22 are that the natural stone panel 101 is cylindrical, the receptacle groove is a blind hole and is arranged coaxially with the natural stone panel 101, the luminous stone product further includes a light-guide column 109 and a plurality of second light-reflecting particles 116, and the light-guide column 109 is built into the receptacle groove along the length direction of the receptacle groove; the fixing layer 1033 is coaxially sleeved on the light-guide column 109, and the backlight face of the fixing layer 1033 tightly conforms to the outer wall of the light-guide column 109; the second light-reflecting particles 116 are built into the light transmitting layer 108 and arranged in one side of the receptacle groove away from the light sources 102; and the light transmitting filler fills the gap in the receptacle groove.

The second light-reflecting particles 116 are built into the light transmitting layer 108; the second light-reflecting particles 116 may be various particles having light-reflecting effects, preferably, the second light-reflecting particles 116 are uniformly built into one side of the light transmitting layer 108 away from the light sources 102, the second light-reflecting particles 116 are submicron spherical silica micro powder having a particle size D50 of 0.5±0.1 μm or 1.0±0.2 μm and a spherical rate of greater than 95%.

In the step 3, the backlight face of the fixing layer 1033 with light-reflecting protrusions 1032 is coaxially pasted on the light-guide column 109 by an adhesive resin, and then the light-guide column 109 with the light-reflecting protrusions 1032 and the fixing layer 1033 is coaxially inserted in the receptacle groove.

Before the step 4, the light transmitting filler uniformly mixed with the second light-reflecting particles 116 is built into and injected into the bottom of the receptacle groove, after the light transmitting filler contacts with the fixing layer 1033, the injection is stopped, after the light transmitting filler is cured, the light transmitting filler is injected into the receptacle groove until the light transmitting filler fills the gap in the receptacle groove, and subsequent steps are performed after the light transmitting filler is cured.

When the light sources emit light, part of the ray of light irradiates into the light-transmitting layer 108 and onto the light-reflecting protrusions 1032, the light-reflecting protrusions 1032 reflect and refract the ray of light, and a large amount of the ray of light is reflected to the inner wall of the receptacle groove, passes through the inner wall of the receptacle groove and goes out of the light transmitting side.

Part of the ray of light emitted by the light sources 102 enters the light-guide column 109, the light-guide column 109 guides the ray of light to the part of the light transmitting layer 108 away from the light sources 102, and the ray of light encounters the second light-reflecting particles 116 in the light transmitting layer 108, the second light-reflecting particles 116 refract and reflect the ray of light, such that the light transmitting layer 108 emits light throughout, and a large amount of the ray of light is reflected to the inner wall of the receptacle groove, passes through the inner wall of the receptacle groove and goes out of the light transmitting side.

By employing this structure, that the elongated natural stone panel 101 emits light throughout can be achieved.

Embodiment 40

As shown in FIGS. 53 to 58, firstly, a block of raw stone 117 may be sawed using a sawing device to produce a slit in the stone block. The slit does not extend to the bottom of the block of the raw stone 117. A curing agent, a transparent adhesive resin, and a light-guide board having a light guide effect are installed (prefabricated) in the slit. The stone panel has a light transmitting face at the light guide face side of the light-guide board; finally, the light transmitting side is machined. Compared with the existing method, the method provided by the present embodiment features that the raw stone 117 is not cut thoroughly with the bottom being left, and then the light-guide board is installed (prefabricated) in the slit through a transparent adhesive resin mixed with a curing agent. After the adhesive resin is cured, the structure at the slit is restored or even strengthened, in the subsequent sawing machining process, due to the fact that the adhesive resin performs permeation and bonding in the stone panel, the stone panel is less likely to be broken, therefore, compared with other sawing devices, the sawing device for sawing the raw stone 117 into sheet materials has a higher efficiency, a simpler machining process, a firmer structure, and shorter consumed time, the technical problem that in the prior art the working procedure is relatively complicated and time consumed by the machining process is relatively long can be effectively solved, and the technical effect of simplifying the working procedure and saving the time consumed by the machining process is achieved.

In order to better understand the above technical solutions, the above technical solutions will be described in detail below with reference to the drawings and specific embodiments.

Figure 53:
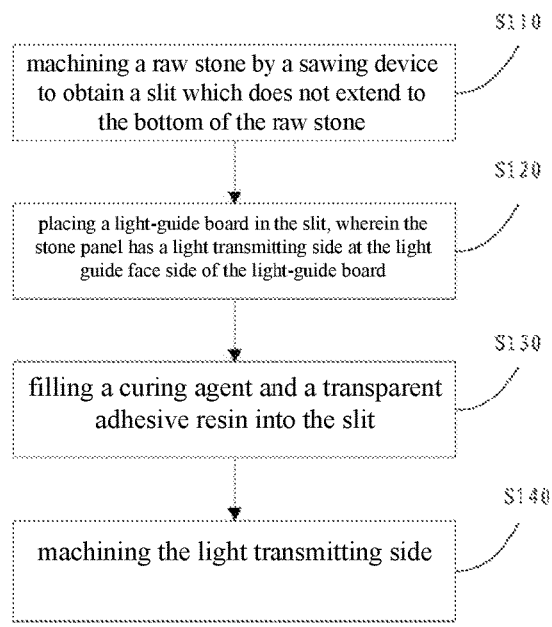
FIG. 53 is a flowchart of a manufacturing method of a luminous stone product in an embodiment 40 of the present disclosure.
Figure 54:
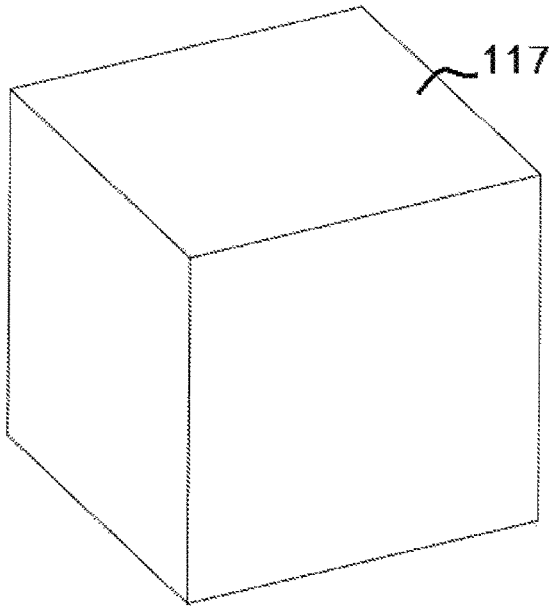
FIG. 54 is a three-dimensional schematic view of a raw stone in the embodiment 40 of the present disclosure.
Figure 55:
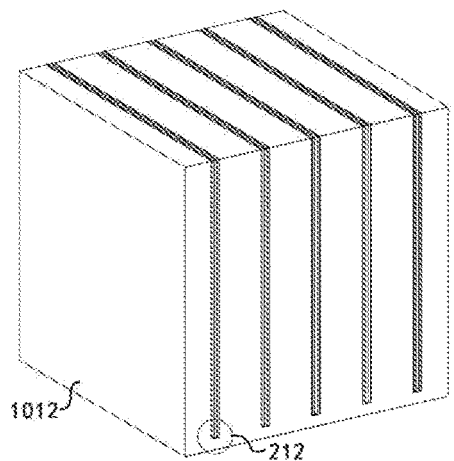
FIG. 55 is a three-dimensional schematic view of a luminous stone product processed by the embodiment 40 of the present disclosure.
Figure 56:
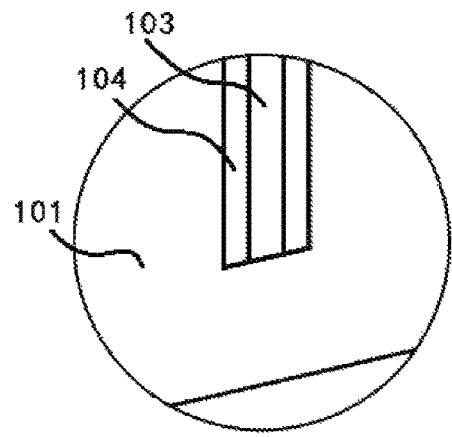
FIG. 56 is a partial enlarged schematic view of a position 212 in FIG. 55.
Figure 57:
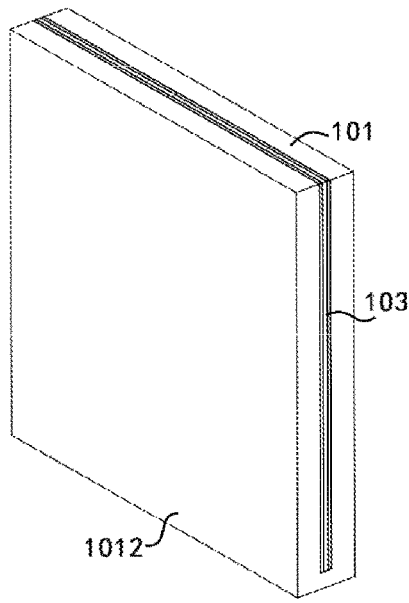
FIG. 57 is a three-dimensional schematic view of another luminous stone product processed by the embodiment 40 of the present disclosure.
Figure 58:
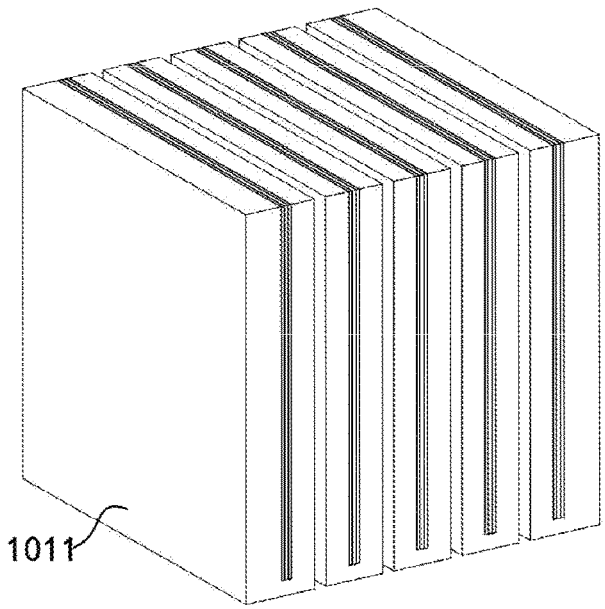
FIG. 58 is a three-dimensional schematic view of a further luminous stone product processed by the embodiment 40 of the present disclosure.

Referring to FIGS. 1 and 53, a manufacturing method of a light-transmittable stone decorative panel provided by an embodiment of the present disclosure includes:

a step S110 of machining (sawing) a block of raw stone 117 by a sawing device to obtain a slit without cutting through the bottom of the block of raw stone 117.

This step may be performed specifically as follows.

In the present embodiment, a larger raw stone may be cut into multiple smaller blocks of raw stone, and a sawing device may be used to process each of the blocks of raw stone to produce slit(s) or corresponding cavity with a selected (desired) depth. It should be noted that the sawing does not cut through the bottom of the stone block, that is, the saw slit does not extend to the bottom of the block of raw stone 117, so as to avoid cutting-off and separating the block of stone into different pieces. The subsequent processing machining is performed according to the above steps.

In the present embodiment, the sawing device may be a large gang saw or a circular saw. The sawing may be performed using a single-blade saw, or using a multi-blade saw to produce multiple slits simultaneously. The number of the saw blades in a saw may be one, two, three, four, five, or the like. Preferably, the number of the saw blades in a saw may five, and the five saw blades can simultaneously saw the same block of raw stone from top to bottom to produce five saw slits in the block. After the five saw slits are dried by heating, the openings on both sides of the saw slits below the top of the block of raw stone are sealed, and then a light-guide board 103 and a curable transparent adhesive resin are disposed in each saw slit, wherein the top of the light-guide board may be flush with a top opening of the block of raw stone. After the curable transparent adhesive resin 104 is completely cured, the sawing device is used to perform a second sawing process to cut through between the saw slits formed in the first sawing process. In the second sawing process, the block of raw stone may be cut into different pieces by cutting through the bottom of the block of stone. to obtain five luminous stone panels. Similarly, if a 30-blade saw is used, 30 luminous stone panels can be obtained at the same time. Further, due to the fact that the stone walls between the saw slits formed after the first sawing process are thicker than the front and rear stone walls of the separated stone panels after the second sawing process, the curing of the curable transparent adhesive resin 104 filled into the saw slits produces reduced shrinkage tension in the stone walls during the curing process. Thus, performing the second sawing process after the curable transparent adhesive resin 104 has been cured can increase the product yield of the production process.

To allow the transparent adhesive resin to better wet and bond with the stone walls beside the slit and to ensure the structural integrity and strength of the resulting stone panel, the following further processing may be performed after the slit(s) is(are) formed in the block of stone 117:

drying treatment of the slit(s) in the block of stone.

In the present embodiment, the block of stone with the slit(s) may be air-dried naturally or sun-dried or baked.

The method further includes a step S120 of placing a light-guide board in the slit, wherein the stone panel has a light transmitting side (front face) at the light guide face side of the light-guide board.

This process is specified as follows.

The light-guide board is placed into the saw slit, wherein the stone panel has a light transmitting side at the light guide face side of the light-guide board, and the edge of the light-guide board may be flush with or slightly lower than the opening of the saw slit of the stone panel. In the above, the light guide face of the light-guide board faces the light transmitting side of the stone decorative panel. If both sides of the stone decorative panel can transmit light, a light-guide board that can guide light on both sides or two light-guide boards are used. The advantage of using two light-guide boards is that under condition of the same area, the light transmitting effect is brighter and the respective light transmitting sides can be independently controlled to be opened or closed.

The method further includes a step S130 of filling a curing agent and a transparent adhesive resin into the slit.

This step is specified as follows.

The raw stone is a natural stone panel, and the slit is the cavity.

In the process of arranging the light-guide board 103 in the slit, when the depth and/or width of the slit is less than 24.5 cm, a curable transparent adhesive resin 104 is filled into the slit and is cured to form the light-guide board 103.

The curable transparent adhesive resin 104 is formed by mixing a curing agent and a transparent adhesive resin 104.

In the present embodiment, the light guide face of the light-guide board is also called a light exiting side or a light emitting side.

The transparent adhesive resin mixed with the curing agent is injected into the saw slit, and the transparent adhesive resin may be flush with or slightly lower than the upward edge of the light-guide board. It should be noted that firstly locations of the saw slit below the upper opening of the saw slit or other places of the saw slit where the adhesive resin may be leaked are sealed, so as to avoid adhesive resin leakage.

In the present embodiment, the transparent adhesive resin may be selected from epoxy resin, polyurethane resin, and unsaturated polyester resin. When the transparent adhesive resin is epoxy resin, the ratio of epoxy resin to its curing agent may be 4:1-3:1; when the transparent adhesive resin is unsaturated polyester resin, the ratio of unsaturated polyester resin to its curing agent may be 100:2-100:5.

It should be noted here that the curing agent and the transparent adhesive resin may also be injected first, and then the light-guide board is placed. Therefore, the order of the step S120 and the step S130 may be interchanged.

This method is further explained, after filling a curing agent and a transparent adhesive resin into the slit, the method further includes:

making a light emitting end of a light emitting component enter the opening of the slit and face the light-guide board.

Specifically, at least one side of the four sides of the stone panel is provided with an opening, and the edge of the light-guide board arranged in the saw slit is exposed. By means of deflashing machining, it is also possible that two sides, three sides, or even four sides are provided with openings. If only one side of a natural stone is cut with the saw and has an opening but the other sides/faces of the stone are uncut and have natural shapes, the resulting stone product may be suitable for manufacturing a stone product that looks like an unprocessed, naturally-shaped stone. When stone product is oriented so that the cut side with the opening is facing down, and the light source is off, the stone product looks like an ordinary natural stone ornament; when the light source is turned on, the light emitted by the light emitting component (e.g. light bulb such as LED light) is emitted from the light transmitting side of the stone panel through the light-guide board, thereby increasing the ornamental value, the practicability and the added value. When more than one side is provided with an opening, more light emitting components (light bulbs) may be installed at the exposed edge of the light-guide board, and the light emitting components are connected to the power line. The more light bulbs are arranged, the higher the light transmitting brightness of the stone panel, and the better the light transmitting effect of the stone panel.

This method is further explained, after making a light emitting end of a light emitting component enter an opening of the slit and face the light-guide board, the method further includes:

arranging a frame on the outside of the light emitting component; wherein the frame can not only cover the light emitting component (light bulb) and prevent it from being exposed, but also play a decorative role.

Specifically, threaded holes may be provided in both ends of each frame, and threaded holes may also be provided in both ends of a 90° bent connecting plate, and screws are made to pass through the threaded holes of the 90° bent connecting plate to be arranged in the threaded holes of the frame, thereby achieving the installation of the frame.

The method further includes a step S140 of machining the light transmitting side (front face).

This step is specified as follows.

After the transparent adhesive resin is cured (through visual inspection and pressing) due to the chemical reaction with the curing agent, sawing machining is performed on the region around the saw slit on the raw stone 117 (in the direction parallel to the saw slit), and the raw stone 117 can be sawed up to the bottom. If the raw stone 117 is sawed up to the bottom, the raw stone 117 will be naturally separated and a desired rough stone panel will be obtained. If the raw stone 117 is not sawed up to the bottom, the bottom of the stone panel will be sawed transversely or knocked and smashed, thereby obtaining a desired rough stone panel.

Then the outer or external surface of the front face of the stone panel, which is also facing the light guide face side of the light-guide board, is buffed and polished for thickness adjustment, and according to the different light transmittance of the natural stone material used, the thickness of the stone material at the front face may be thinned to be within 0.5-3.5 mm.

In the present embodiment, the raw stone 117 is a stone raw material for manufacturing a light-transmittable stone decorative panel.

In order to utilize luminous light which not only plays a role in saving power, but also plays an emergency role in the event of a sudden power failure, a photoluminescent material is also mixed into the transparent adhesive resin in the process of filling the curing agent and transparent adhesive resin into the slit.

In the present embodiment, the photoluminescent material is luminescent powder.

The present disclosure provides a variety of display methods, wherein the first method includes:

before filling a curing agent and a transparent adhesive resin into the slit, further including:

arranging a pattern layer between the light guide face of the light-guide board and the side wall of the slit (the inner surface of the light transmitting side of the stone panel), wherein when the light-guide board acquires light and emits light, the light transmitting side of the stone panel exhibits the set pattern effect.

Specifically, the step of arranging a pattern layer between the light guide face of the light-guide board and the side wall of the slit includes:

coating the light guide face of the light-guide board and/or the side wall of the slit with pigments; wherein when the light source is turned on, the light transmitting side of the stone panel exhibits the coated pattern;

or, arranging a stencil light-proof medium between the light guide face of the light-guide board and the side wall of the slit; wherein when the light source is turned on, the light transmitting side of the stone panel exhibits the set stencil pattern;

in the present embodiment, the light-proof medium may be, but is not limited to, an aluminum plate, steel plate, or the like;

or, arranging a patterned light-transmittable medium between the light guide face of the light-guide board and the side wall of the slit;

wherein in the present embodiment, the patterned light-transmittable medium may be, but is not limited to, a self-patterned fiber cloth, after the adhesive resin is injected, the fiber cloth is soaked, after the adhesive resin is cured, the fiber cloth and the adhesive resin form a whole, ensuring a firm structure, when the light source is turned on, the light transmitting side of the stone panel exhibits the pattern on the fiber cloth.

The second method includes:

performing relief processing to the outer surface of the light transmitting side, such that the thickness of the region on the light transmitting side except for the relief is 0.5-3.5 mm; wherein when the light source is turned on, the region on the light transmitting side except for the relief has light transmittance, thereby showing a pattern formed by the region except for the relief or setting off the relief effect.

The third method includes:

performing counter-relief processing to the outer surface of the light transmitting side, such that the thickness of the counter-relief region on the light transmitting side (the distance from the bottom of the counter-relief to the inner surface of the light transmitting side of the stone panel in the saw slit) is 0.5-3.5 mm; wherein when the light source is turned on, the counter-relief part has light transmittance or has better light transmittance, thereby showing an counter-relief pattern.

The fourth method includes:

performing stencil processing to the light transmitting side to constitute a pattern by stencil parts, and filling light-transmittable filling blocks into the stencil parts, such that the stone decorative panel has a parquet effect. The filling block may be machined into a trapezoid with a small inside and a large outside, during filling and installing, the gap is smaller, and the stone decorative panel is more beautiful.

Furthermore, in the process of filling the light-transmittable filling blocks into the stencil parts, the filling blocks are pasted.

Specifically, an adhesive resin may be applied to the filling blocks and/or the stencil side walls first, and then the filling blocks are placed into the stencil parts, so as to achieve the adhesion between the filling blocks and the stencil side walls and the adhesion among various filling blocks, thereby ensuring the stability of the structure.

In the present embodiment, the filling blocks are natural stone filling blocks, artificial stone filling blocks, glass filling blocks, resin synthetic filling blocks, and the like.

It should be noted that the above second method, third method, and fourth method all belong to the category of machining the light transmitting side of the raw stone 117 in the step S140.

Subsequently, the sawing device is replaced with a machining device for manufacturing cylinders. According to the above steps, a cylindrical light-transmittable stone product can be obtained, and can be applied to flower pots, lampshades, pen holders, etc. Similarly, the stone decorative panel may also be machined into other shapes such as a semicircle or a curved structure.

The beneficial effects of the present embodiment include the followings. 1. Firstly, a raw stone 117 is machined by a sawing device to obtain a slit which does not extend to the bottom of the raw stone 117; then a curing agent, a transparent adhesive resin and a light-guide board having a light guide effect are installed (prefabricated) in the slit, and the stone panel has a light transmitting side at the light guide face side of the light-guide board; finally, the light transmitting side is machined. Compared with the existing method, the method provided by the present embodiment features that the raw stone 117 is not cut through initially with the bottom remaining intact, and then the light-guide board is installed (prefabricated) in the slit through a transparent adhesive resin mixed with a curing agent. After the adhesive resin is cured, the structural integrity in the stone walls besides the slit is reinforced or even strengthened. In the subsequent processing, due to the fact that the filling material permeates into and bonds the stone walls in the stone panel, the stone panel is less likely to be broken, therefore. Compared with other cutting devices, the sawing device for sawing the raw stone 117 into sheet materials has a higher efficiency, a simpler machining process, a strengthened or reinforced structure, and a shorter production time. A technical problem in the prior art is that the processing procedure is relatively complicated and time-consuming, which can be effectively solved by the present embodiment. Thus, the technical effect of simplifying the processing procedure and saving the production time can be achieved.

2. If a multi-blade sawing device is used, multiple luminous stone panels can be obtained simultaneously at a time, and the procedure is further simplified and the time consumed by the process is further reduced.

3. After the raw stone 117 is machined by the sawing device to obtain a slit, the slit is also dried, such that the transparent adhesive resin can better permeate and bond with the stone panel and further ensure the integrity and strength of the wall structure of the stone panel.

4. In the process of filling the curing agent and transparent adhesive resin into the slit, a photoluminescent material is also mixed into the transparent adhesive resin, such that luminous light can be utilized, which not only plays a role in saving power, but also plays an emergency role in the event of a sudden power failure.

5. A frame is arranged on the outside of the light emitting component, the frame can not only cover the light emitting component (light bulb) and prevent it from being exposed, but also play a decorative role.

6. A pattern layer is arranged between the light guide face of the light-guide board and the slit, when the light-guide board acquires light and emits light, the light transmitting side of the stone panel exhibits the set pattern effect.

7. The present disclosure provides three methods for arranging the pattern layer, different arrangements may be carried out according to different situations, thereby improving the operability.

8. The present disclosure also provides four methods for machining the light transmitting side of the raw stone 117, and different methods may be selected to perform machining according to different situations, so as to achieve different display effects.

Embodiment 41

Figure 59:
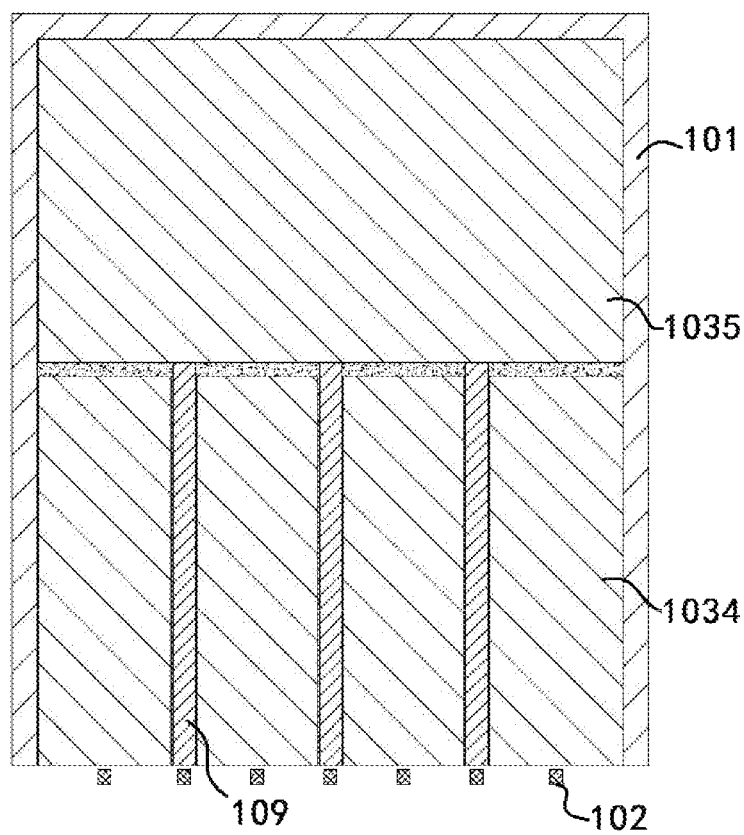
FIG. 59 is a three-dimensional schematic view of a luminous stone product mentioned in an embodiment 41 of the present disclosure.

As shown in FIG. 59, the similarities between the embodiment 41 and the embodiment 1 will not be explained again, and the differences between the embodiment 41 and the embodiment 1 are that the light-guide boards 103 further include a first light-guide board 1034 and a second light-guide board 1035; the first light-guide board 1034 is built into the cavity and provided with a plurality of through holes, and has a first light entering face, a first light exiting face, and the light exiting face of the first light-guide board 1034 is arranged close to the light transmitting side (front side); the second light-guide board 1035 has a second light entering face and a second light exiting face, is arranged on one side of the first light-guide board 1034 away from its first light entering face and is built into the cavity; the luminous stone product further includes at least one light-guide column 109, the light-guide columns 109 are arranged in one-to-one correspondence with the through holes, one end of the light-guide column 109 is arranged to face the light sources 102, and the other end of the light-guide column 109 is arranged to face the light entering face of the second light-guide board 1035, the number of the light-guide columns 109 may be one, two, or three, preferably, the number of the light-guide columns 109 is three, and the three light-guide columns 109 are all built into the cavity.

By arranging the light-guide columns 109, when the light sources 102 emit light, part of the ray of light emitted by the light sources 102 enters the corresponding light-guide columns 109, and the light-guide columns 109 transmit the ray of light to the remote second light-guide board 1035, such that the remote second light-guide board 1035 emits light to avoid the condition that the second light-guide board 1035 away from the light sources 102 is too dark, thereby making the entire luminous stone panel emit light.

Embodiment 41

This embodiment relates to a luminous stone product including:

a natural stone panel 101 including at least one receptacle groove/recess and at least one light transmitting side (front face) 1012, wherein any of the receptacle grooves/recesses is correspondingly provided at the rear (back) side of the at least one light transmitting side 1012, any of the receptacle grooves/recesses extends to an edge of the natural stone panel 101 and forms at least one opening, the extension direction of the receptacle groove/recess is parallel to the light transmitting side, and the edge of the natural stone panel 101 is a side wall surrounding the light transmitting side 1012;

a light source 102 provided at the opening of the natural stone panel 101; and a light-guide board 103 placed in the receptacle groove/recess and receiving light from the light source 102, wherein a gap between the light-guide board 103 and the inner wall of the receptacle groove/recess is filled with a curable transparent adhesive resin 104.

Embodiment 42

This embodiment relates to a luminous stone product including:

a natural stone panel 101 including at least one receptacle groove/recess and at least one stencil side, wherein any of the receptacle grooves/recesses is correspondingly provided at the back side of the at least one stencil side, any of the receptacle grooves/recesses extends to an edge of the natural stone panel 101 and forms at least one opening, the extension direction of the receptacle groove/recess is parallel to the light transmitting side, and the edge of the natural stone panel 101 is a side wall surrounding the light transmitting side 1012, and light transmitting stone filling blocks 107 are arranged at the stencil parts;

a light source 102 provided at the opening of the natural stone panel 101; and a light-guide board 103 placed in the receptacle groove/recess and receiving light from the light source 102, wherein a gap between the light-guide board 103 and the inner wall of the receptacle groove/recess is filled with a curable transparent adhesive resin 104.

The specific embodiments of the present disclosure described above do not constitute a limitation on the protection scope of the present invention. Any other corresponding variations and modifications made according to the technical concept of the present disclosure shall be included in the protection scope of the claims appended to the present disclosure.

What is claimed is:

1. A process for making a luminous stone product:
   sawing a block of stone to produce a slit in the block of stone without separating the block into separate pieces, wherein
      the block of stone has a top, a bottom, a front face, a rear face opposite to the front face, a first side, and a second side opposite to the first side, and
      the slit is formed between the front face and the rear face and provides an opening in at least one of the top and the first and second sides, and
   filling the slit with a light transmitting reinforcing material, through the opening, to support and reinforce at least a part of the front face;
   after the front face has been reinforced by the light transmitting reinforcing material, machining an external surface of the front face to reduce a thickness of at least a portion of the front face;
   attaching a light source to the stone for emitting light into or from the slit;
   wherein the slit, the front face, and the light source are configured to allow light emitted from the light source to transmit through the light transmitting reinforcing material and the front face.

2. The process of claim 1, wherein the light transmitting reinforcing material comprises light-reflective particles.

3. The process of claim 1, comprising forming protrusions on an inner wall surface at the rear face of the block, or inserting a rear panel into the slit and attaching the rear panel to the rear face, the rear panel comprising protrusions, wherein the protrusions protruding towards the front face and being configured to reflect light from the opening towards the front face.

4. The process of claim 1, comprising modifying a visual effect of the light transmitted from the light source to the front face.

5. The process of claim 1, wherein the light source is attached to the stone such that the light source emits light towards the light transmitting reinforcing material in the slit through the opening.

6. The process of claim 1, wherein the light transmitting reinforcing material defines a cavity extending to the opening, and the light source is disposed inside the cavity of the light transmitting reinforcing material in the slit through the opening.

7. The process of claim 6, comprising providing a visual-effect modifying layer between the front face and the light source, wherein the visual-effect modifying layer is painted with a selected paint, or is a lucent or opaque stencil placed between the light source and the front face.

8. The process of claim 1, wherein
   the light transmitting reinforcing material is formed by filling the slit with a curable transparent adhesive resin and a curing agent and curing the transparent adhesive resin in the slit; or
   the light transmitting reinforcing material is formed by filling the slit with the curable transparent adhesive resin, the curing agent, and a transparent solid material, and curing the transparent adhesive resin in the slit.

9. The process of claim 1, wherein the machining the external surface of the front face comprises at least one of
   (i) grinding the external surface of the front face to reduce a thickness of the front face;
   (ii) machining the external surface to form a relief or counter-relief on the external surface, wherein the front face has a minimum thickness of 0.5 mm to 3.5 mm at the part reinforced and supported by the light transmitting reinforcing material, and
   (iii) machining the external surface to form a stencil in the front face, the stencil comprising hollows filled with a transparent material.

10. The process of claim 1, wherein said sawing comprises sawing the block of stone with a multi-blade circular saw or a gang saw to produce a plurality of slits simultaneously.

11. A luminous stone product, comprising:
    a natural stone body comprising a light transmitting front face, an opposite rear face, a top edge, a bottom edge, and first and second side edges, the body having a groove extending in at least one of the edges and between the front face and the rear face, wherein the groove provides an opening in the at least one edge;
    a light transmitting filler material in the groove for supporting and reinforcing at least a part of the front face, the light transmitting filler material defining a cavity extending to the opening; and
    a light source disposed inside the cavity,
    wherein the body is formed of a single piece of natural stone; and the groove and the front face are configured to allow light emitted from the light source to transmit through the supported and reinforced part of the front face.

12. The product of claim 11, wherein the light source comprises a light guide board or a light bulb.

13. The product of claim 11, comprising a visual-effect modifying layer between the front face and the light source, wherein the visual-effect modifying layer is a layer of a paint painted on an inner surface of the front face, or is a lucent or opaque stencil placed between the light source and the front face, or is a layer of the light transmitting filler material having a selected color.

14. The product of claim 11, wherein an external surface of the front face is flat or curved.

15. A luminous stone product, comprising:
    a natural stone body comprising a light transmitting front face, an opposite rear face, a top edge, a bottom edge, and first and second side edges, the body having a groove extending in at least one of the edges between the front face and the rear face, wherein the groove providing an opening in the at least one edge;
    a light transmitting filler material filling the groove for supporting and reinforcing a part of the front face; and
    a light source attached to the natural stone body for emitting light into the groove through the opening,
    wherein the body is formed of a single piece of natural stone; and the groove and the front face are configured to allow light emitted from the light source to transmit through the light transmitting filler material and the supported and reinforced part of the front face.

16. The product of claim 15, further comprising light-reflecting particles in the light transmitting filler material or protrusions in the groove protruding from the rear face towards the front face, for reflecting light from the light source towards the front face.

17. The product of claim 15, comprising a visual-effect modifying layer between the front face and the light source, wherein the visual-effect modifying layer is a layer of a paint painted on an inner surface of the front face, or is a lucent or opaque stencil placed adjacent the inner surface of the front face.

18. The product of claim 15, wherein the light transmitting filler material is mixed with a photoluminescent material.

19. The product of claim 15, wherein an external surface of the front face comprises a relief or counter-relief, and the front face has a minimum thickness of 0.5 mm to 3.5 mm; or wherein the front face comprises a stencil comprising hollows filled with a light transmitting filler.

20. The product of claim 15, wherein an external surface of the front face is flat or curved.

* * * * *

UNITED STATES PATENT AND TRADEMARK OFFICE
CERTIFICATE OF CORRECTION

| | |
|---|---|
| PATENT NO. | : 11,827,050 B2 |
| APPLICATION NO. | : 17/297990 |
| DATED | : November 28, 2023 |
| INVENTOR(S) | : Jianqiao Yang |

Page 1 of 1

It is certified that error appears in the above-identified patent and that said Letters Patent is hereby corrected as shown below:

In the Claims

Column 27:
Claim 1, Line 17, "A process for making a luminous stone product:" should be changed to
-- A process for making a luminous stone product, comprising: --

Signed and Sealed this
Fourteenth Day of May, 2024

*Katherine Kelly Vidal*

Katherine Kelly Vidal
*Director of the United States Patent and Trademark Office*